US012630185B2

(12) United States Patent
Braunstein et al.

(10) Patent No.: US 12,630,185 B2
(45) Date of Patent: May 19, 2026

(54) SYSTEMS AND METHODS FOR PREDICTIVELY MANAGING USER EXPERIENCES IN AUTONOMOUS VEHICLES

(71) Applicant: Lyft, Inc., San Francisco, CA (US)

(72) Inventors: Jennie Arielle Braunstein, San Francisco, CA (US); Timothy Tay Chao, San Francisco, CA (US); Adam Jacob Derewecki, San Franciso, CA (US); Hangyu Li, Bellevue, WA (US); Derek Michael Petersen, Las Vegas, NV (US); Alexander McNaughton Luke Wallace, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 710 days.

(21) Appl. No.: 17/355,925

(22) Filed: Jun. 23, 2021

(65) Prior Publication Data

US 2022/0410932 A1 Dec. 29, 2022

(51) Int. Cl.
B60W 60/00 (2020.01)
B60H 1/00 (2006.01)
(Continued)

(52) U.S. Cl.
CPC ..... B60W 60/0013 (2020.02); B60H 1/00814 (2013.01); B60W 10/30 (2013.01); B60W 40/08 (2013.01); G01C 21/3415 (2013.01)

(58) Field of Classification Search
CPC .. B60W 60/0013; B60W 10/30; B60W 40/08; B60W 50/0098; B60W 2540/043; B60W 2556/45; B60W 2756/10; B60H 1/00814; B60H 1/00742; B60H 1/00771; G01C 21/3415; G01C 21/343; G01C 21/3438
See application file for complete search history.

(56) References Cited

U.S. PATENT DOCUMENTS 10,692,371 B1 * 6/2020 Nix ........................ G07C 5/008
2017/0282821 A1 10/2017 Zych
(Continued)

*Primary Examiner* — Anne Marie Antonucci
*Assistant Examiner* — Patrick Daniel Mohl
(74) *Attorney, Agent, or Firm* — ALG Intellectual Property, LLC

(57) ABSTRACT

The disclosed computer-implemented method may include monitoring, during a ride provided by an autonomous vehicle (AV), passenger communications between a passenger and a remote agent using an in-vehicle electronic device. The method may further include identifying passenger ride preferences based on a passenger request, and in association with a first occurrence of a ride event. The method may also include providing confirmation, via the in-vehicle electronic device, that the request is being fulfilled, the fulfillment of which causes a change in the passenger's AV experience based upon changes to features of the AV. The method may further include generating, based upon the request, a prediction of passenger ride preferences for the passenger and then, during a subsequent AV ride carrying the passenger, applying the predicted passenger ride preferences to an AV during a second occurrence of the ride event. Various other methods, systems, and computer-readable media are also disclosed.

21 Claims, 30 Drawing Sheets

400

410 — Monitor communications

420 — Identify passenger ride preferences

430 — Provide confirmation of request fulfillment

440 — Generate predicted passenger ride preferences

450 — Apply predicted passenger ride preferences to AV

(51) Int. Cl.
    *B60W 10/30*       (2006.01)
    *B60W 40/08*       (2012.01)
    *G01C 21/34*       (2006.01)

(56)              References Cited

U.S. PATENT DOCUMENTS

| | | | |
|---|---|---|---|
| 2020/0377113 A1* | 12/2020 | Whikehart | G06Q 40/08 |
| 2021/0001873 A1 | 1/2021 | Ingrody et al. | |
| 2021/0223051 A1* | 7/2021 | Hochberg | G08G 1/123 |
| 2021/0253125 A1* | 8/2021 | Patel | B60W 60/0011 |
| 2022/0364870 A1* | 11/2022 | Wang | G01C 21/3476 |
| 2024/0280367 A1* | 8/2024 | Grealish-Rust | G01C 21/3461 |

* cited by examiner

Live Assistant

Call

Chris Whitmore
Remote Operator

400

410 —
Monitor communications

420 —
Identify passenger ride preferences

430 —
Provide confirmation of request fulfillment

440 —
Generate predicted passenger ride preferences

450 —
Apply predicted passenger ride preferences to AV

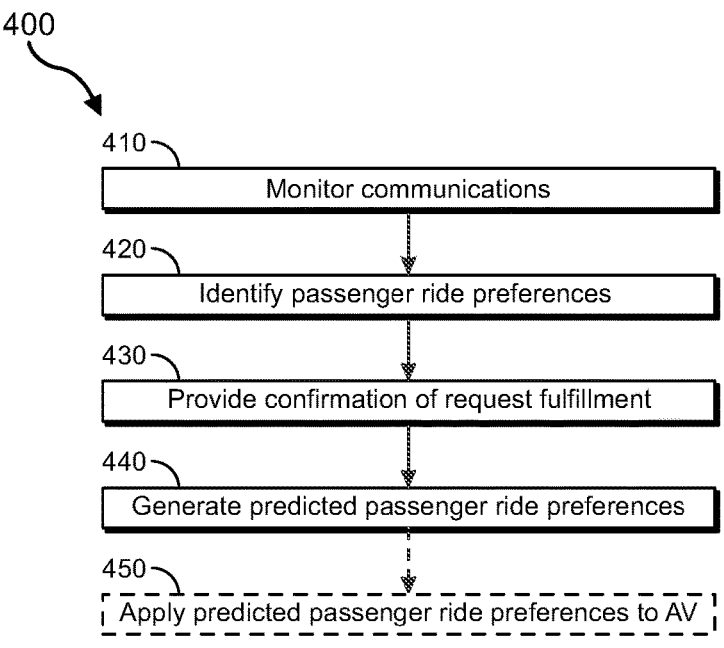

Fleet of Autonomous Vehicles 501

502

503

504

505 {
Feature A: Changeable
Feature B: Unchangeable
Feature C: Changeable

Feature B: Changeable
Feature C: Changeable
Feature D: Changeable
Feature E: Changeable Feature A: Changeable
Feature B: Changeable

*FIG. 5*

SYSTEMS AND METHODS FOR PREDICTIVELY MANAGING USER EXPERIENCES IN AUTONOMOUS VEHICLES

BACKGROUND

In current transportation ecosystems, ridesharing users typically request and receive rides from human transportation providers. These human transportation providers listen to rider requests and may try to fulfill some of these requests. For instance, a transportation rider may request that the windows be rolled down, or that the heat be turned up, or that the originally chosen destination be updated to a new destination. The human transportation provider may comply with some or all of these requests when possible. These options, however, may be limited or unavailable entirely in autonomous vehicles (AVs) that lack the presence of a human driver. Current AVs designed to provide ridesharing transportation, for example, may be unable to respond to rider requests during the ride. This, in turn, may make would-be riders hesitant to choose autonomous vehicles as a viable option for their transportation requests.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a flow diagram of an example method for predicting passenger ride preferences and controlling features of an AV according to those preferences.

FIG. 5 illustrates an example scenario in which a fleet of autonomous vehicles each has different features and variability in whether those features are changeable.

Figure 1:
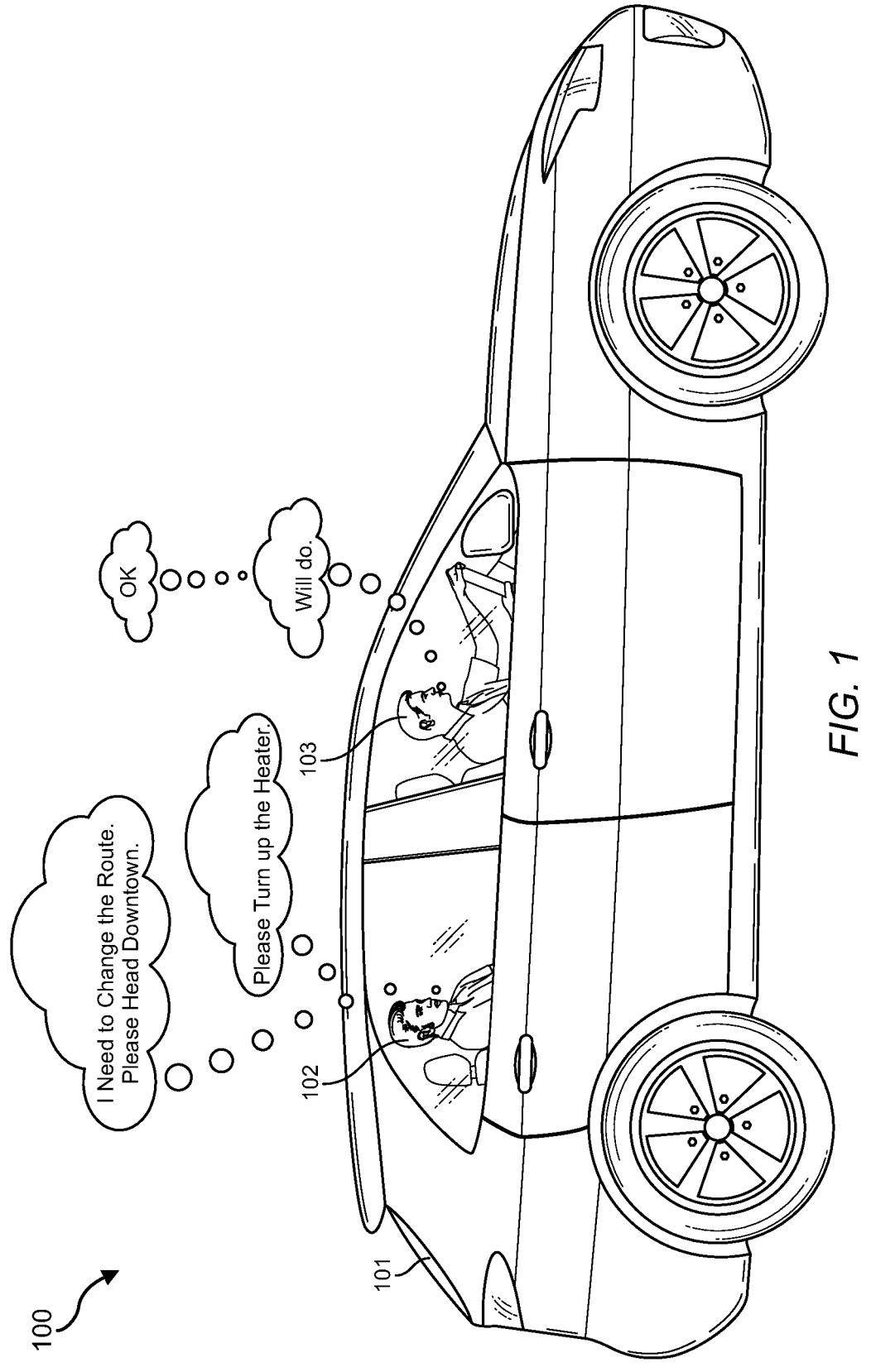
FIG. 1 is an illustration of an example scenario involving a transportation provider receiving and fulfilling requests from a passenger.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to methods and systems for predicting passenger ride preferences and controlling features of an autonomous vehicle (AV) according to those preferences. The disclosed computer-implemented methods may include monitoring, during a ride provided by an autonomous vehicle (AV), passenger communications between a passenger and a remote agent using an in-vehicle electronic device. The method may further include identifying passenger ride preferences based on a passenger request, and in association with a first occurrence of a ride event. The method may also include providing confirmation, via the in-vehicle electronic device, that the request is being fulfilled, the fulfillment of which causes a change to the AV ride based on the passenger rider preferences. The method may further include generating, based upon the request, a prediction of passenger ride preferences for the passenger and then, during a subsequent AV ride carrying the passenger, applying the predicted passenger ride preferences to an AV during a second occurrence of the ride event.

FIG. 1 illustrates an embodiment 100 in which a passenger 102 has requested a ride from a ridesharing provider 103. In this embodiment 100, the ridesharing provider 103 is a traditional human driver. During the course of the ride in the human-piloted vehicle 101, the human driver may listen to and respond to the rider's requests. For instance, the passenger 102 may indicate to the ridesharing provider 103 that they need to change their route. In such cases, the passenger 102 may simply say to the ridesharing provider 103 that they need to head downtown instead of to another location. The ridesharing provider 103 may hear that request and may respond as a matter of course. Similarly, if the passenger 102 wants to make a change to the interior climate, such as adjusting the heat, the passenger may simply ask the provider to turn up the heater. The human driver may then verbally respond and turn up the heater in the car.

In this traditional model, the human driver and passenger may interact to fulfill the needs of the passenger. In an autonomous vehicle, however, there may be no other humans present in the vehicle. As such, if the passenger 102 wanted to change their route or turn up the heater in the vehicle 101 or make other changes to the properties of their AV ride, the passenger may be unable to do so. Moreover, the passenger 102 may feel uneasy about getting into an AV that lacks any human interaction. For instance, the passenger 102 may not want to get into an autonomous vehicle if they feel that they will be unable to change any properties associated with the ride or, more particularly, that they will be unable to stop the car or change their route or take some other action if an emergency occurs during the ride, as there is no driver in the vehicle to fulfill those requests.

Still further, current AVs that provide rides to ridesharing riders do not attempt to determine what the passenger's preferences will be, and further fail to take measures to meet those preferences in advance. Current AVs often show up to pick up their riders in a default state, typically set by the manufacturer of the AV or by the transportation management system that manages the AVs. The AV picks up the passenger, and the passenger sits through the ride in the default manner, unable to change settings or preferences associated with the ride, and unable to speak with any human users about making changes to those settings or preferences. Accordingly, traditional ridesharing systems, and in particular, rides serviced by autonomous vehicles, may lack the amenities and features needed to entice riders to request rides from an AV. As such, AV fleets may remain underutilized, resulting in wasted resources including wasted fuel (e.g., gasoline or electricity), wasted computing and network resources managing these underused autonomous vehicles, and wasted transportation capacity that could otherwise be used to efficiently transport riders to their respective destinations.

As will be explained in greater detail below, in some examples the above-described concepts may leverage, utilize, and/or be implemented within a dynamic transportation matching system. This dynamic transportation matching system may arrange transportation on an on-demand and/or ad-hoc basis by, e.g., matching one or more passengers and/or passenger devices with one or more transportation providers and/or transportation provider devices. For example, a dynamic transportation matching system may match a passenger to a transportation provider that operates within a dynamic transportation network (e.g., that is managed by, coordinated by, and/or drawn from by the dynamic transportation matching system to provide transportation to passengers).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or micro-mobility vehicles (MMVs) that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars) that may be capable of operating with little or no input from a human operator.

Figure 2A:
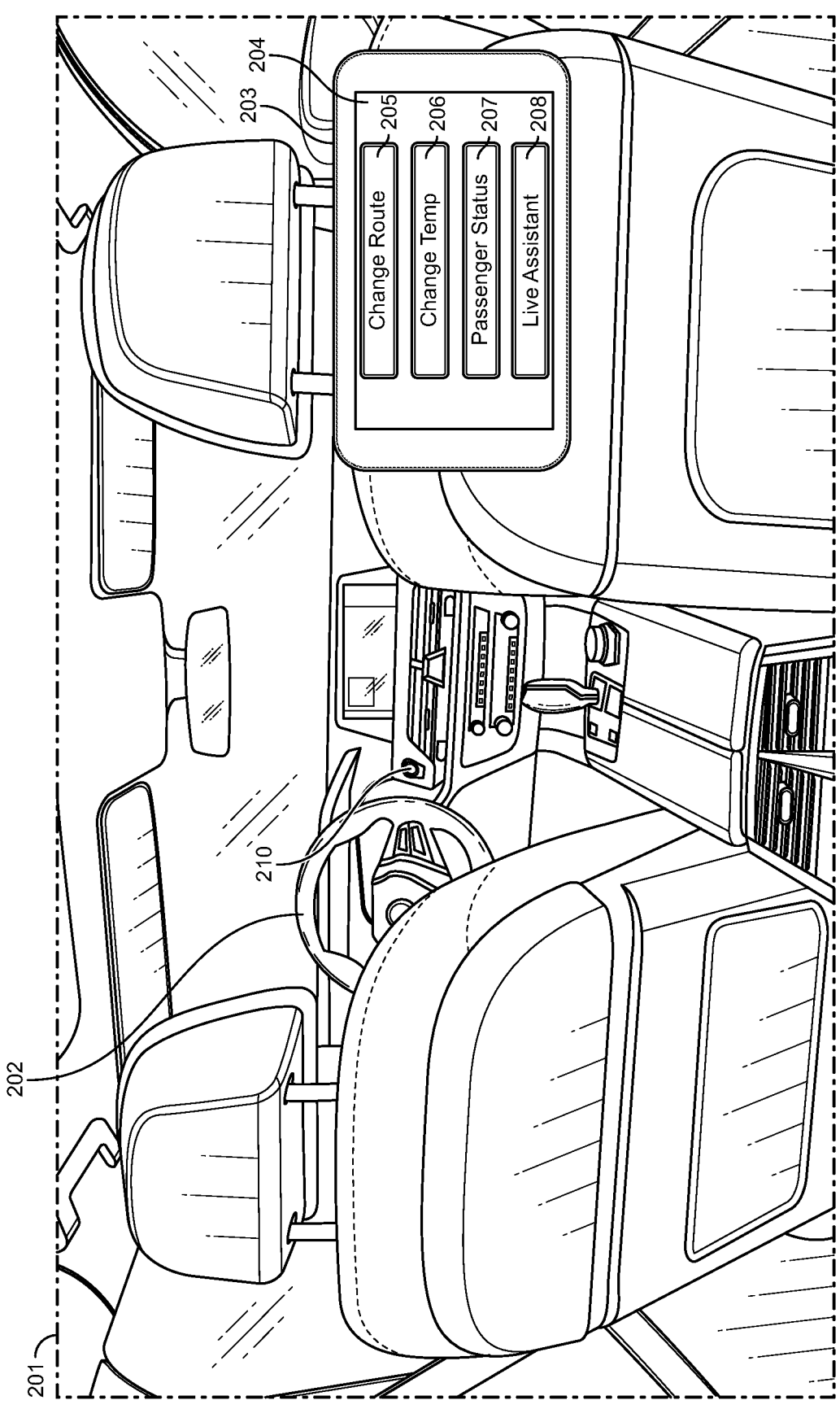
FIGS. 2A-2E illustrate example scenarios involving a user interface that allows passengers to change AV features and/or communicate with a live remote agent.

FIG. 2A illustrates an embodiment in which an autonomous vehicle 201 may be provided to a passenger to transport the passenger from one location to another. As will be shown further below, the passenger may use a ridesharing application, a website, or other means for requesting a ride using an AV. The AV may arrive at the pickup location, and the passenger may enter the AV 201. When inside the AV, the passenger may notice that there is no driver, and that the car is being driven by an automated system (e.g., 202). To ease any potential passenger concerns about the lack of human driver, an electronic device 203 or other monitor or display may be provided within the AV 201. The electronic device

203 may be positioned substantially anywhere within the AV and, at least in some cases, may be adjustable. Substantially any number of these electronic devices 203 may be implemented within the AV 201. In some cases, the electronic device 203 may be mounted within the AV (e.g., to a seat or headrest). The electronic device 203 may be a touchscreen device that allows touch inputs from the passenger. The electronic device 203 may also be equipped with a camera to recognize gesture-based inputs, a microphone to recognize speech inputs, physical buttons to recognize touch inputs, or other embedded sensors or components configured to recognize different types of user inputs. In some embodiments, the electronic device 203 may belong to the passenger. In such cases, the electronic device may have a ridesharing application installed thereon that allows the user to request AV rides and receive other information using the ridesharing application.

Figure 2B:
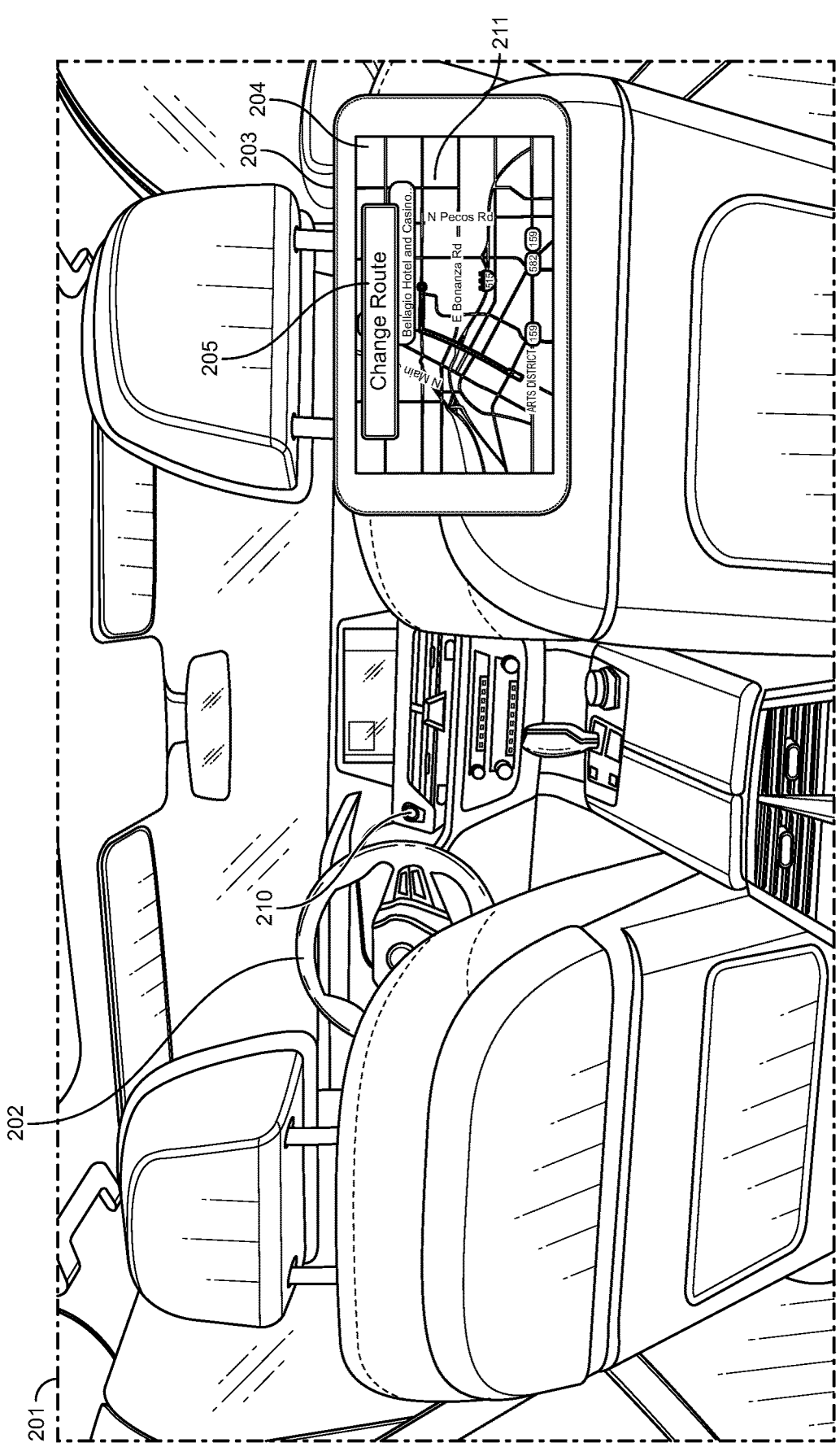

The electronic device 203 may also include a display that shows a user interface 204. The user interface 204 may include substantially any number or type of user interface elements including UI buttons, knobs, dials, sliders, input fields, or other UI elements. These user interface elements (e.g., 205-208 of FIG. 2A) may allow riders to interact with the AV and/or interact with other users, including remote agents. For instance, user interface element 205, labeled "Change Route," may allow the passenger to change their originally selected route. For example, as shown in FIG. 2B, if a passenger originally requested to go to the Bellagio Hotel, for instance, and now wants to go to a different hotel, the passenger may select user interface (UI) element 205 to change their route. This may be done at substantially any time during a ride, and may be done multiple times in a single ride. The user interface 204 may show a map 211 with the AV's current location and/or selected destination. In some cases, the passenger may interact with the map 211 to select a new destination or may type in a new destination using a software-based keyboard. That new destination may be sent to an underlying transportation management system (e.g., to computer system 301 of FIG. 3), where the route change request is evaluated. If the route change is possible, the passenger may receive a notification on the user interface 204 and/or on one of their mobile devices that the route change is permitted and will be implemented. Additionally or alternatively, the map 211 may be updated to reflect the new destination.

Using UI element 205, a user may thus be free, at any time during the ride, to change their selected destination. In some cases, the underlying transportation system that provides the AV may perform calculations or make determinations as to whether the AV is capable of traveling to the new destination based on fuel considerations, time of day considerations, range of operation considerations, legal restrictions that apply to AVs, or other factors. If the underlying transportation system approves the change in route, the AV may begin transporting the passenger to the new destination. In some cases, a remote agent (e.g., 330 of FIG. 3) may make a note of the change in route and may call in to the electronic device 203 to confirm (either via audio or video) with the passenger that the route change is correct. If the route change is correct and is permitted by the transportation management system, the remote agent or the transportation management system may send AV control signals to the AV to change over to the new route.

Figure 2C:
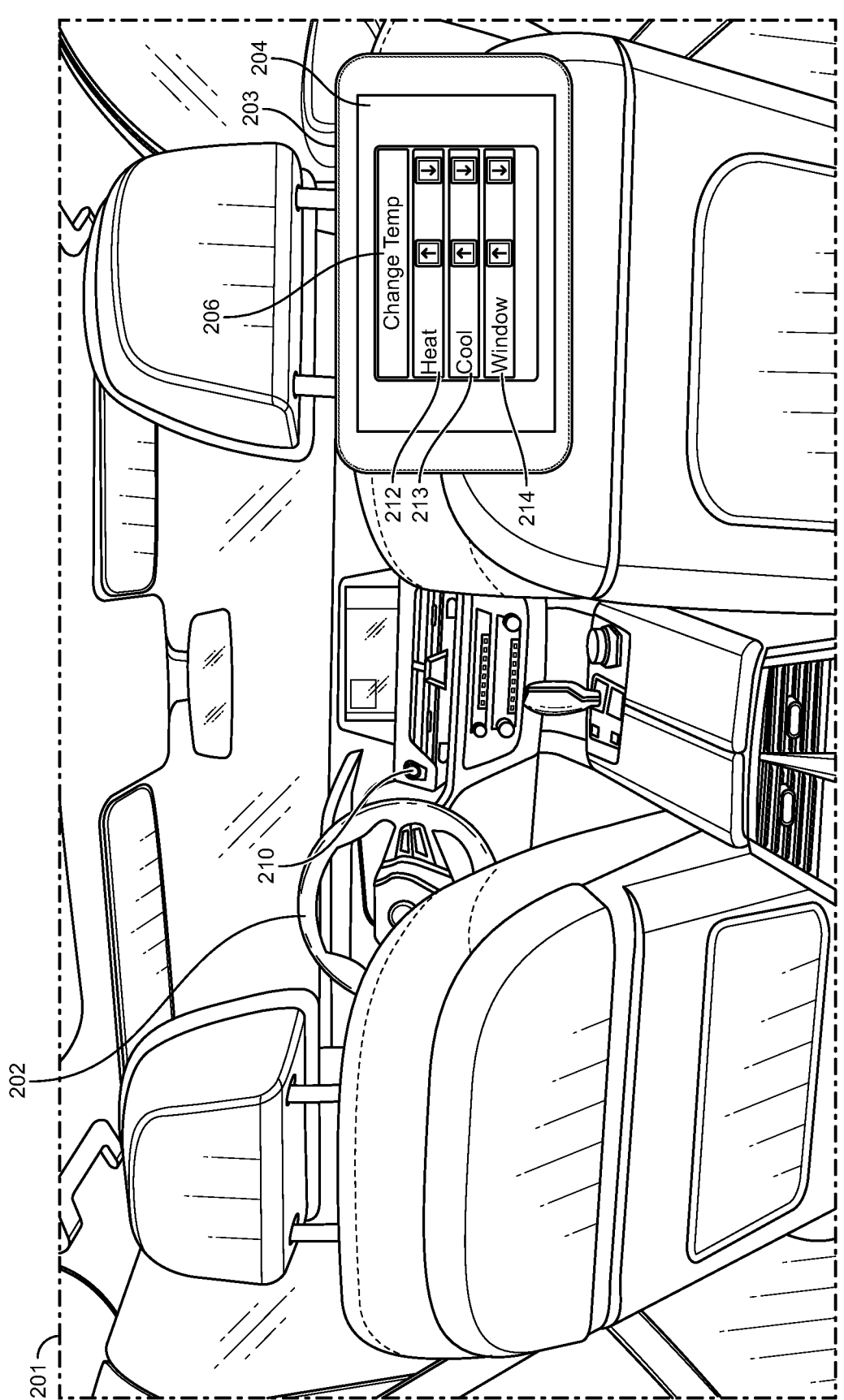

Additionally or alternatively, the user interface 204 may include a UI element 206, labeled "Change Temp," that allows the passenger to change various heating, ventilation, or air conditioning (HVAC) features in the AV. For example, as shown in FIG. 2C, the user interface 204 may allow the user to change features in the AV 201 that will affect the internal temperature of the AV. For instance, the passenger may use the up or down buttons for the "Heat" UI element 212 to turn up or turn down the heater. Or, the passenger may use the up or down UI buttons for the "Cool" UI element 213 to turn up or turn down the air conditioner, or control air-conditioned seats. Still further, the passenger may use the up or down buttons next to the "Window" UI element 214 to roll up or roll down certain windows or all the windows in the AV. In some cases, the AV may allow control of the sunroof to further change the interior climate of the AV 201. In such cases, the user interface 204 may include additional UI elements that facilitate movement of the sunroof.

In some embodiments, as will be explained in greater detail below, each AV in a fleet of AVs managed by a transportation management system may be produced by different vehicle manufacturers. As such, each AV in the fleet may include different climate-based features, and may allow, disallow, or limit control of those HVAC features. Thus, the "Change Temp" UI element may provide different features in different AVs, including providing or limiting the ability to roll down windows (or removing the option to roll down windows), the ability to change the heat up to maximum (or to limit the maximum heating setting), the ability to turn on air conditioning or air conditioned seats or to limit that feature, the ability to open or close the sunroof (if equipped) or to limit that feature, etc. Accordingly, the user interface 204 may change and may be dynamically generated specifically for each AV. Moreover, touching (or otherwise selecting) UI element 206 to "Change Temp" may result in different options being displayed in different AVs, depending on their capabilities and/or manufacturer limitations.

Figure 2D:
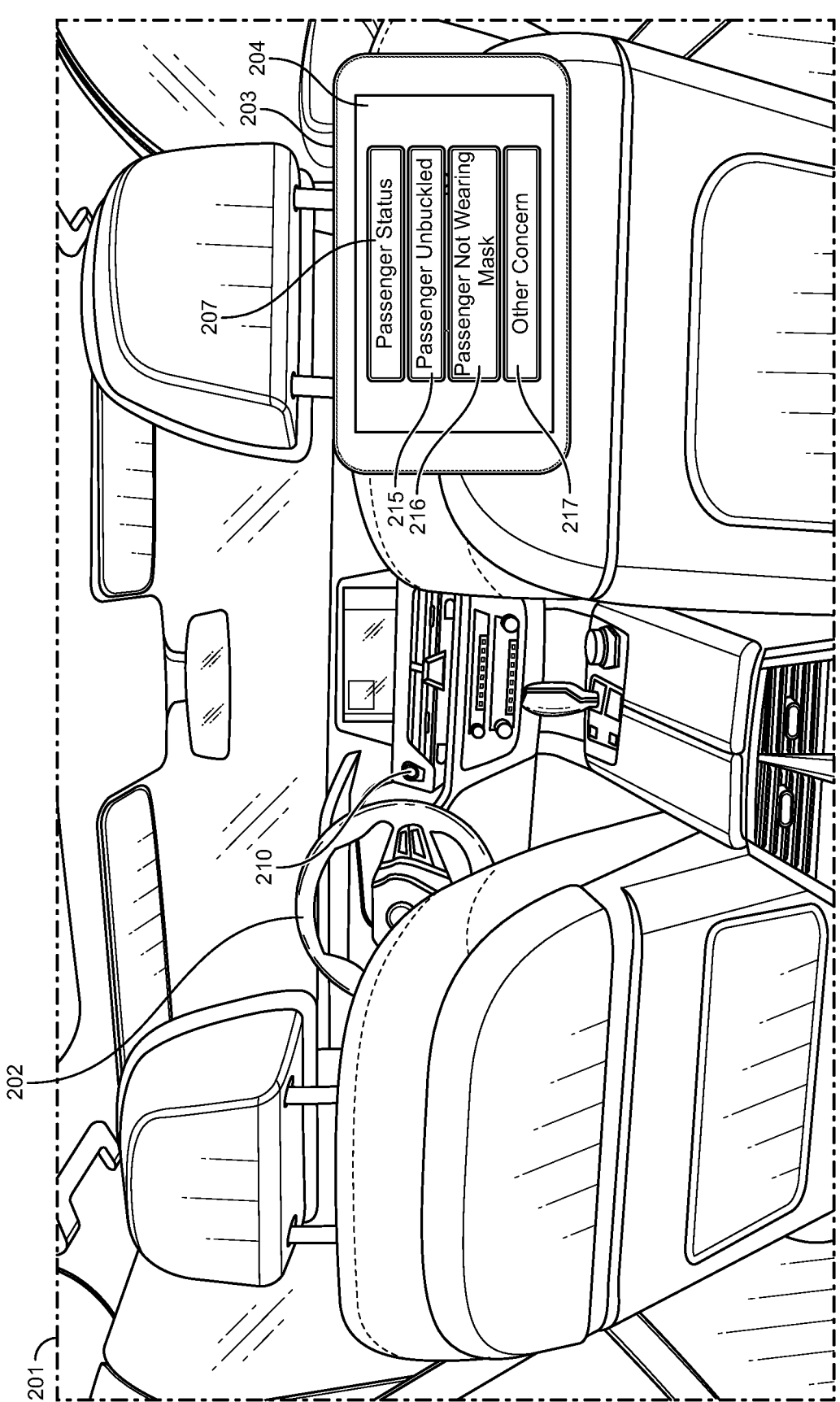
Figure 2E:
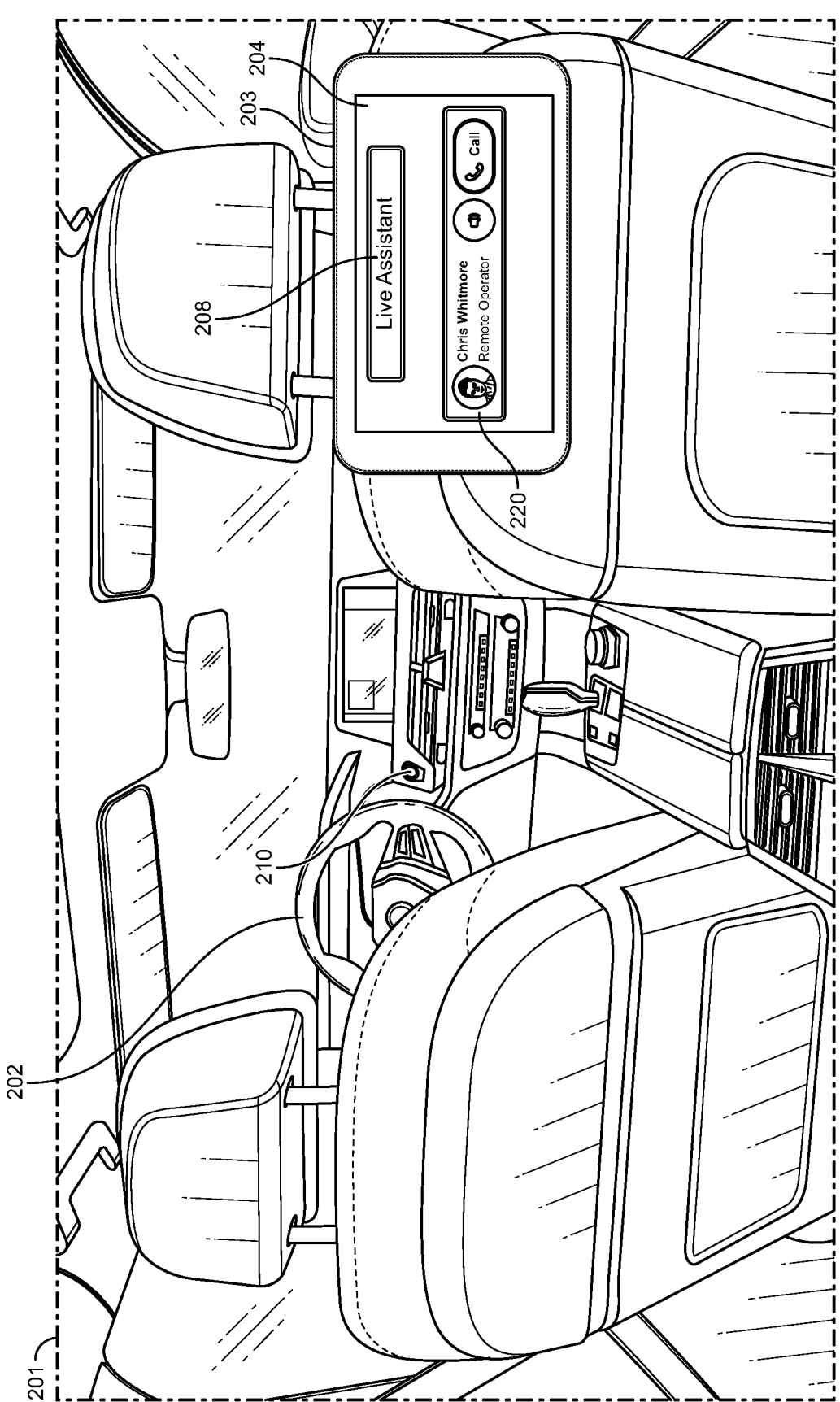

Still further, the UI element 207, labeled "Passenger Status," may allow a passenger to submit potential concerns or identify other issues they may be having, either before the AV ride, during the AV ride, or after the AV ride has completed. For example, the passenger may select UI element 207, which takes the passenger to an example user interface shown in FIG. 2D. This user interface illustrates sample passenger concerns including "Passenger Unbuckled" 215 to indicate that at least one of the other passengers in the AV is not wearing their seatbelt. The user interface may also include a sample passenger concern "Passenger not Wearing Mask" 216, or may provide an "Other Concern" button 217 that allows the passenger to submit a specific concern using keyboard or speech inputs. In some cases, for instance, selecting UI element 217 may bring up a field that allows the passenger to type in their concern and then submit it. The concern may be surfaced to a remote agent who evaluates the concern and takes appropriate action.

Like the other user interfaces described above, the user interface of FIG. 2D may also present different options when in different AVs or in different types of AVs. In some cases, selecting the "Passenger Status" UI element 207 may immediately cause the AV to pull over to the side of the road and turn on its flashing lights. In other cases, the UI element 207 may present an option to talk to a remote assistant. In some embodiments, the user may input their own concerns via text or speech. Each type of AV in a fleet may have different safety features and capabilities. As such, the "Passenger Status" button 207 may provide different options to indicate concerns in different AVs. Moreover, each UI screen may include multiple layers of UI elements that may be activated as a user drills down into various options. It should be noted here that the UI elements shown in FIGS. 2A-2E are merely examples of UI elements that may be shown, and it should be recognized that many other UI elements may be provided in the user interface in different AVs and in different use cases.

The user interface 204 may also include UI element 208, labeled "Live Assistant," which may allow the passenger to interface with a live human operator. The communication may be synchronous or asynchronous, and may occur over text, voice, video, or a combination thereof. In some embodiments, selecting UI element 208 may initiate a video call with a live assistant 220 that is trained to interface with AV riders. The live assistant may be remote to the passenger and may be referred to herein by different names including a "remote agent," a "remote assist agent," "ride assist agent," or a "live assistant." The live assistant 220 may be able to answer the passenger's questions regarding AVs in general, or answer questions on how to use AVs for ridesharing, or how to control certain features within an AV, or answer other questions. The live assistant may attempt to resolve the passenger's concerns throughout the AV ride. The live assistant may also control various features within the AV, including potentially some features that may not be directly available for the passenger to control through the user interface 204. The live assistant may also provide recommendations on where to go, good places to eat, activities to do in an area, or may provide other concierge-type services to the passenger during the ride. Accordingly, although no human driver is present in the AV 201, any passenger that is part of the AV ride may request, at any time, to speak with a live human assistant who may then help the AV rider with their questions or other concerns. The audio or video call with the live assistant 220 may be initiated before the AV ride begins, during the AV ride, or after the AV ride is over. In some cases, the audio/video call with the live assistant may last for the duration of the AV ride.

In some embodiments, the interior of the AV may include a camera 210. In some cases, the camera may be positioned inwardly to face the passengers in the AV. The camera 210 may gather (and, in combination with one or more of the computing systems described herein, analyze) data about the occupants of the vehicle, including where they are sitting, whether they have moved during the ride, whether they are buckled in, whether they are wearing masks, what their demeanor is (e.g., whether they are calm and quiet or loud and angry), whether they are attempting to interact with the electronic device 203, or whether they are taking other actions within the AV. In some cases, the camera 210 may be monitored by a remote agent. The camera 210 may be in addition to any cameras that are part of the electronic device 203. In some cases, the remote agent (or one or more of the computing systems described herein) may monitor any or all of the cameras placed within the AV. Similarly, the electronic device 203 or other parts of the AV, including the infotainment system, may include embedded microphones configured to help a remote agent to determine whether any passenger concerns have arisen during an AV ride (e.g., another passenger is yelling or shouting or is otherwise being disruptive). In some cases, the user interface 204 may be configured to notify passengers that microphones and/or cameras are in use within the AV, so that the passengers can reduce their expectations of privacy while in the AV. In other cases, the user interface 204 may notify passengers that microphones and cameras within the AV have been turned off, so the passengers can maintain a level of privacy. In some cases, the overall level of privacy for an AV ride may be a feature that is provided for a passenger upon determining that the passenger has a strong desire for such or is a long-time trusted rider.

In some embodiments, the camera 210 and other sensors within the AV may (in combination with one or more of the computing systems described herein) be configured to detect events. An "event" may occur when a passenger interacts with the electronic device 203, perhaps selecting an HVAC setting or asking to speak with a live assistant. The camera may note that the passenger has interacted with the electronic device 203 and may note which AV features have changed in response to that interaction. An event may also occur when the camera or other sensor is used to make an observation. For instance, a remote agent may see through the camera 210 that the passenger appears uncomfortable, perhaps because the temperature is too low. If the HVAC system is initialized after the passenger interacts with the electronic device 203, the system may determine that the passenger likes a warmer internal temperature. The system may also learn this information directly through the passenger's inputs into the user interface 204 and/or by analyzing, using machine learning, the various data sources provided by the electronic device 203. In at least some cases, and as will be described in greater detail below, the system may determine that the same passenger is taking an AV ride and may apply the passenger's passenger ride preferences in advance, so that the passenger will enter into a warm (or warmer than normal) vehicle.

In another example, a passenger may select a route from an airport to a hotel. This passenger may have received an AV ride on that route before. The underlying system may note that the passenger has previously changed the route to the hotel using the user interface 204, or may determine that the passenger looked uncomfortable on the previous ride due to an excessive amount of bumps or turns in the road. Any of these occurrences may be stored as an event. Thus, when the passenger selects AV transportation from the airport to that same hotel, the system may identify ride preferences for the passenger that were applied during the previously traveled route (e.g., driving on a different route specified by the passenger that includes less bumps or turns) and may apply those preferences to the AV ride during the subsequent AV ride. Accordingly, at a high level (as will be explained further below), the systems described herein may identify a passenger's predicted ride preferences, either directly through the passenger's interactions with the electronic device 203 or with a live assistant 220 or indirectly through camera or microphone feed data, and apply those predicted passenger ride preferences to the subsequent AV ride proactively before the AV passenger enters the vehicle. In some cases, predicted passenger ride preferences for the passenger may even be automatically applied to the AV ride while the AV ride is being carried out, without the passenger having to input a formal request for those passenger ride preferences. In some cases, applying the predicted passenger ride preferences during the AV ride or before the AV ride may include sending AV control signals to the AV to control features that correspond to the predicted passenger ride preferences. Other types of functionality may also be provided within the AV 201, as will be explained further below with regard to computing environment 300 of FIG. 3 and method 400 of FIG. 4.

Figure 3:
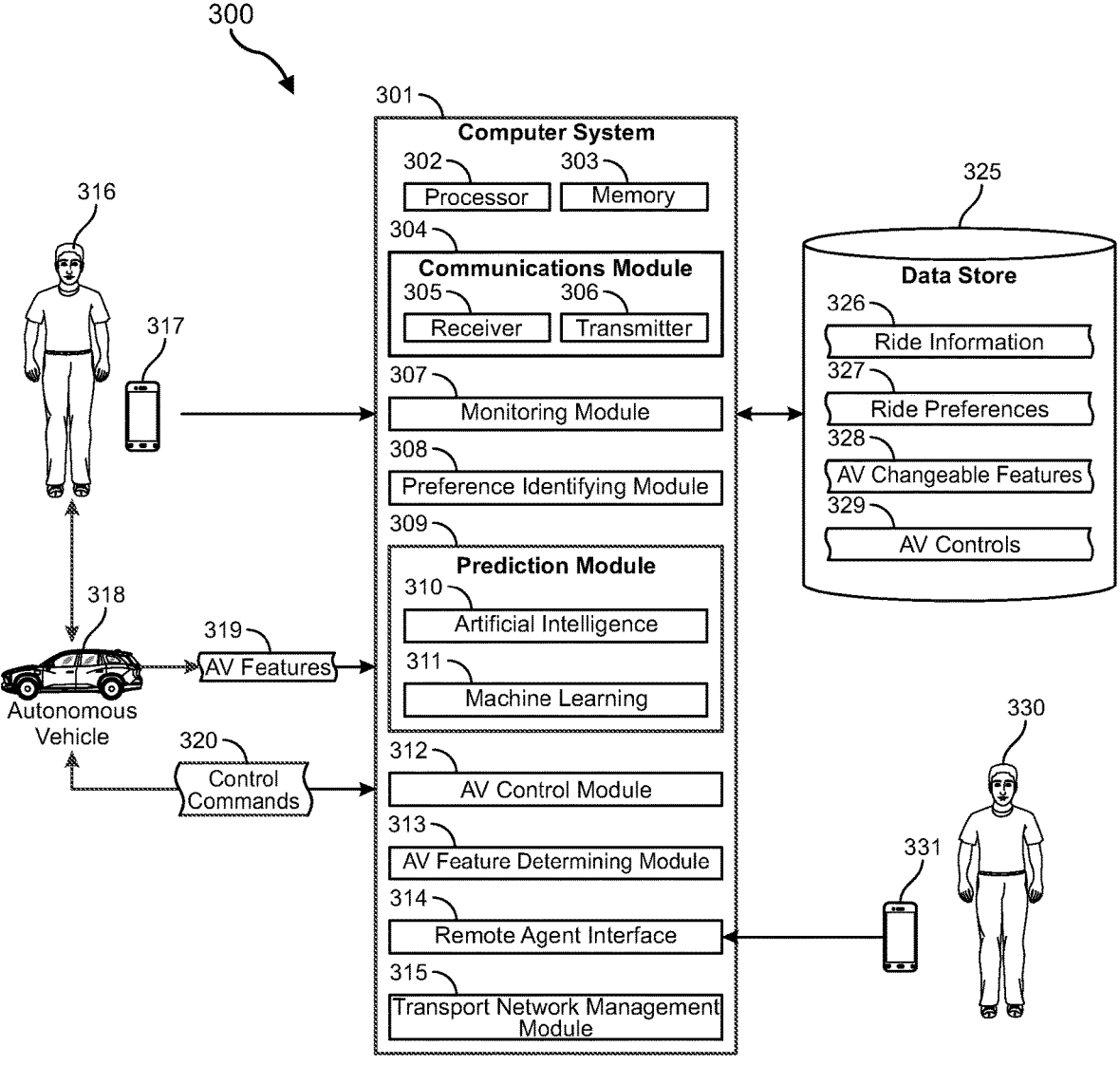
FIG. 3 is an illustration of an example architecture in which passenger ride preferences are predicted and various features of an AV are controlled according to those preferences.

FIG. 3 is an illustration of an example computing environment 300 in which passenger ride preferences may be predicted and AV features may be controlled according to those predicted preferences. As shown in FIG. 3, a transportation management computer system 301 may, via a variety of modules, predict passenger ride preferences 327 and control changeable features 328 of an AV 318 according to those preferences. The computer system 301 may be substantially any type of computer system including a single, local computer system (e.g., a personal computer (PC) or a smartphone) or a distributed (e.g., cloud) computer system with multiple different nodes. The computer system 301 may include software modules, embedded hardware components such as hardware processors, or may include a combination of hardware and software.

In some cases, the computer system 301 may include at least one processor 302 and at least some system memory 303. The computer system 301 may include program modules for performing a variety of different functions. The program modules may be hardware-based, software-based, or may include a combination of hardware and software. Each program module may use computing hardware and/or software to perform specified functions, including those described herein below. The computer system 301 may also include a communications module 304 that is configured to communicate with other computer systems. The communications module 304 may include any wired or wireless communication means that can receive and/or transmit data to or from other computer systems. These communication means may include hardware interfaces including Ethernet adapters, WIFI adapters, and/or hardware radios including, for example, a hardware-based receiver 305, a hardware-based transmitter 306, or a combined hardware-based transceiver capable of both receiving and transmitting data. The radios may be cellular radios, Bluetooth radios, global positioning system (GPS) radios, or other types of radios. The communications module 304 may be configured to interact with databases, mobile computer devices (such as mobile phones or tablets), embedded systems, or other types of computer systems.

The computer system 301 may also include a monitoring module 307. The monitoring module 307 may be configured to monitor and/or record information related to a ride (e.g., ride information 326) taken by a passenger (e.g., 316). For example, passenger 316 may request a ride from an AV (e.g., 318) using their electronic device 317 (e.g., a smartphone, tablet, laptop, smartwatch, or other electronic device). Alternatively, another person may request the AV ride and the passenger 316 may simply take part in the AV ride. The monitoring module 307 may be configured to monitor ride information 326 that includes data on different aspects of the passenger's AV ride. The ride information 326 may be stored in a local or remote data store 325. The ride information 326 may include indications of time, pickup location, destination, type of AV, number of riders, distance traveled, time spent by the passenger in the AV, and other similar data. The ride information 326 may also include indications of whether the passenger 316 attempted to adjust the internal temperature of the AV (e.g., whether they wanted the temperature hotter or colder), whether the passenger wanted to change the radio station, whether the passenger wanted to roll the windows down or up, whether the passenger had any safety concerns and, if so, which concerns, whether the passenger wanted to speak with a live assistant, and whether or how the live assistant was able to help.

In some cases, the monitoring module 307 may be configured to monitor, during a ride provided by AV 318 that is managed by a transportation management system (e.g., transportation network management module 315 of computer system 301), various passenger communications between the passenger 316 and a remote agent 330 using an in-vehicle electronic device in the AV (e.g., electronic device 203). The remote agent 330 may be located external to the AV 318, and may connect to the computer system 301 through their own electronic device 331. In some cases, for example, the remote agent may be geographically remote from the AV. In such cases, the remote agent may be located in a customer service center or may be located in another city or state or country that is remote from where the AV is currently located. As noted above with regard to FIG. 2E, the in-vehicle electronic device 203 may enable communication between the remote agent 330 and the passenger 316 through a remote agent interface 314. The remote agent interface 314 may be configured to receive commands and information from the remote agent's electronic device 331 and pass those commands and/or that information on to the AV 318 and/or to the passenger's electronic device 317. The communications between the passenger 316 and the remote agent 330 may be monitored by the monitoring module 307, and any informational aspects or outcomes of the communication may be stored in data store 325 as ride information 326.

The preference identifying module 308 of computer system 301 may be configured to identify passenger 316's ride preferences 327 based on the ride information 326, including information gleaned from communications between the passenger 316 and the remote agent 330. The passenger's ride preferences 327 may be determined in conjunction with events. For instance, if the passenger 316 likes traveling with the windows rolled down, or likes listening to a certain radio station, or likes having a specific television station playing on an electronic device (e.g., 203 of FIG. 2A), likes having a warmer than normal internal temperature, likes automatically connecting to a live assistant upon entry into the AV, likes having their selected route shown on the electronic device, likes traveling slower or quicker to their selected destination, likes having audible route progress indications, likes taking a certain route to a given destination (e.g., past a scenic point), or has any other preferences that may be gleaned from the ride information 326, the preference identifying module 308 may be configured to identify and note those ride preferences 327.

In this context, an event may include determining that the passenger 316 has specifically requested one or more of the above-identified features (or other features not listed). Alternatively, an event could include inferring, from camera data (e.g., from camera 210) or from microphone data, or from seat sensor information, or from seat belt buckle sensor information, or from other sensor inputs, that the passenger wants or would prefer one or more of the above-identified features. This inference process may involve artificial intelligence 310 or machine learning 311 to analyze video feeds or audio feeds or other sensor data to determine or infer the passenger's preferences. The machine learning 311 may, for example, analyze a video feed to determine, from the passenger's facial expressions or body language, that the passenger is uncomfortable or uneasy or, to the contrary, is complacent and happy. This information may be used by the preference predicting module 309 to determine the passenger's ride preferences 327. Then, upon the subsequent occurrence of the event, the AV control module 312 may send control commands 320 to the AV to invoke those features. Alternatively, at least in some cases, the identified passenger ride preferences for certain features may be implemented automatically upon initially determining that the specified passenger 316 will be taking an AV ride, or will be travelling on a previously traveled route.

The prediction module 309 of computer system 301 may thus analyze the stored ride information 326 and predict which (if any) of these identified passenger ride preferences 327 should be applied to future rides. Artificial intelligence algorithms 310 may be implemented by the prediction model 309 as part of this process. These algorithms may analyze the circumstances surrounding past rides, including time, distance, external temperature, destination location, etc., and may further analyze the passenger's ride preferences 327 for those rides. The prediction module 309 may then determine, based on these analyses, which of the passenger's ride preferences should be provided to a current ride or to future rides. As part of this calculus, the prediction module 309 may determine which features on a given autonomous vehicle are changeable (e.g., 328). If the prediction module 309 determines that a given ride preference is to be provided on a currently requested or subsequent ride, and the ride preference is controllable on that specific AV, the AV control module 312 may send one or more control commands 320 to the AV to provide that AV ride preference for the passenger 316.

Thus, for example, if the preference identifying module 308 determines that a preference for rolled down windows is to be provided for passenger 316, and the computer system 301 determines, based on AV changeable features 328, that the windows of that AV can be controlled remotely, the AV control module 312 may send control commands 320 preemptively to the AV before the AV arrives at the pickup location, so that the passenger 316 will have their preference of rolled-down windows satisfied on their AV ride. Similarly, if the passenger 316 has a preference for a specific radio station, or for a more laid-back driving style, for instance, as gleaned from a communication between the passenger 316 and the remote agent 330, if these features are controllable on that specific AV, the AV control module 312 may send control commands 320 to the AV turning on the radio and tuning to the passenger's preferred radio station, or may select a driving mode in the AV that accelerates slower, avoids lane changes when possible, maintains a longer following distance behind vehicles, or takes other similar actions to provide the passenger a more laid back ride. Accordingly, if the preference identifying module 308 identifies a passenger's ride preferences 327 based on previous rides or other interactions with the passenger, the prediction module 309 may predict which of those preferences to provide in a given ride based on the ride information 326, and may send control signals to the AV to provide those preferences.

In some cases, the prediction module 309 may determine that a given preference is not to be provided, or is to be modified during the ride. For instance, if the user typically prefers the heater to be turned on, but the day is already warm, the prediction module may take current weather conditions into consideration and omit or modify that preference to lower the heat in the car. Similarly, if the user has a preference for rolled-down windows, and the prediction module 309 determines that rain is forecasted for the passenger's location, the windows may remain rolled up, or may start in a rolled-down mode until rain is detected in the passenger's location (e.g., via an external-facing camera). Similarly, if the user has a preference for a certain route to a destination, and the prediction module 309 determines, based on accessed traffic data, that the passenger's preferred route will result in significant delays (e.g., due to a traffic jam or accident), the prediction module 309 may determine that, on that ride, that route preference is not to be fulfilled. Accordingly, the prediction module 309 may take outside factors into consideration including weather information, traffic information, other passenger's preferences (e.g., on shared rides), or other information, and use that data to provide, not provide, or modify any preferences that are applied to an AV. As such, even if a passenger has a certain preference, that preference may be overridden in some cases based on external circumstances. Still further, the passenger's preferences may also be tempered on a vehicle-to-vehicle basis according to which features are actually (remotely) changeable on the specific AV that is providing the ride to the passenger 316.

FIG. 4 is a flow diagram of an exemplary computer-implemented method 400 for predicting passenger ride preferences and controlling features of an autonomous vehicle (AV) according to those preferences. The steps shown in FIG. 4 may be performed by any suitable computer-executable code and/or computing system, including the system illustrated in FIG. 3. In one example, each of the steps shown in FIG. 4 may represent an algorithm whose structure includes and/or is represented by multiple substeps, examples of which will be provided in greater detail below.

As illustrated in FIG. 4, at step 410, one or more of the systems described herein may monitor, during an autonomous vehicle (AV) ride provided by an AV carrying a passenger and managed by a transportation management system configured to manage a fleet of AVs, various passenger communications between the passenger and a remote agent using an in-vehicle electronic device in the AV. The remote agent may be located external to the AV, and the in-vehicle electronic device may enable communication between the remote agent and the passenger during the AV ride. At step 420, the systems described herein may identify, based on at least one request provided by the passenger to the remote agent using the in-vehicle electronic device and in association with a first occurrence of a ride event during the AV ride, various passenger ride preferences related to the AV ride. As the term is used herein, a "ride event" may refer to any instance in which an AV passenger requests and receives a ride from an AV, or any occurrence or action taken by the passenger during the AV ride. The ride event may include any of the various processes and steps involved in an AV ride or any occurrences or events that happen during these steps, including requesting the AV ride, locating the AV upon the arrival of the AV at the passenger's location, riding in the AV to the destination, and disembarking from the AV once the AV has reached the passenger's specified destination. The terms "ride preferences" or "passenger ride preferences" may refer to any preferences expressed by the passenger during the AV ride. These ride preferences may be chosen explicitly by the user, or may be implied based on the passenger's actions during the ride. These concepts will be explained further below.

At step 430, the systems may provide confirmation, via the in-vehicle electronic device and subsequent to the remote agent receiving the request provided by the passenger in association with the first occurrence of the ride event, that the request is being fulfilled by the AV system or by the remote agent, the fulfillment of which may cause a change to the AV ride based on the passenger ride preferences. At step 440, the systems may generate, based upon the request provided by the passenger to the remote agent, one or more predicted passenger ride preferences for the passenger. In such cases, during a subsequent AV ride carrying the passenger, the predicted passenger preferences may be applied to the subsequent AV ride in association with a second occurrence of the ride event. At optional step 450, the systems may apply, during the subsequent AV ride carrying the passenger, at least one of the predicted passenger ride preferences to the subsequent AV ride in association with the second occurrence of the ride event.

In some cases, the computer system 301 of FIG. 3 may be configured to communicate with a particular autonomous vehicle to identify various features provided by that AV. For example, as shown in FIG. 3, the computer system 301 may send a communication to AV 318 requesting to know which features it is capable of providing and which, of those features, are changeable. The communication may also request to determine, for those features that are changeable, the manner in which the features are changeable. The AV 318 may thus, in response, provide an indication of AV features 319 to the computer system 301. The computer system 301 may then store the indication of changeable AV features 328 in data store 325. This request for features may occur once, or may occur multiple times over the lifetime of the AV. As such, if AV features break or are no longer available for change (e.g., the radio stops functioning, the windows won't roll down, or a new state law prohibits the viewing of television in the AV), the list of changeable features 328 may be updated to reflect those features that are currently changeable. Moreover, if the manner of change varies over time (e.g., because of a rain storm, windows cannot be rolled down) or if the fleet owner decides they no longer want riders to be able to open the sunroof, these updates may be communicated to the computer system 301 (either directly from the manufacturer or through the AV 318). The user interface 204 of FIG. 2A may also be updated to remove those options from the available UI options, or may be modified to reflect the updated manner in which the features are now changeable.

As shown in embodiment 500 of FIG. 5, a fleet of AVs 501 may include many different types of AVs including sedans, sport utility vehicles, crossovers, trucks, minivans, and other types of AVs. Each autonomous vehicle, or each type (e.g., each make and model) of AV may include its own set of features. Some of these features may come standard on the AV, and some features may be added as options (e.g., sunroofs, air-conditioned seats, active suspensions, etc.). A ridesharing company (or other entity) may own or manage a fleet of AVs 501. Each AV 502, 503, or 504 (or others not shown) may have its own set of features 505. For instance, AV 502 includes Features A, B, and C, where only Features A and C are changeable, while Feature B is not changeable by the rider. AV 503 has features B, C, D, and E, all of which are changeable on that vehicle. Accordingly, as can be seen, even though Feature B is unchangeable on AV 502, it may be changeable on AV 503. AV 504 includes only two features, A and B, both of which are changeable on that AV. Thus, the AV feature determining module 313 of computer system 301 of FIG. 3 may keep track of which features are available on each AV or AV type and, of those features, which are changeable by a passenger and/or a ride assist agent 330. The AV feature determining module 313 may also determine and store the manner in which the changeable features are changeable (e.g., does the feature turn on or off, or is it adjustable on a scale, is that scale adjustable based on weather or other external conditions, is the feature only available with a single passenger in the car or with multiple passengers, etc.). In this manner, the AV feature determining module 313 may acquire and maintain an up-to-date list of stored indications identifying which features each AV has and which are changeable.

The AV feature determining module 313 of computer system 301 may also be configured to store, for each AV in the fleet of AVs 501, an associated indication of how to control the features that are changeable for that AV type. Thus, the computer system 301 may store a set of AV controls 329 that is specific to each AV or each AV type in the fleet of AVs 501. Each changeable feature 505 may have a corresponding control signal that causes the feature to manifest. For instance, if the feature includes the electronic device 203 of FIG. 2A automatically displaying a pickup location, route, and destination, the computer system 301 may store an AV control that communicates with the AV or with the electronic device 203 directly to display the selected route and other information. If the AV control 329 is an automatic door closing feature (e.g., in a trunk lid or sliding minivan door), the AV control may include a specific instruction or set of software code that, when transmitted to the AV, causes the AV to automatically close its sliding door. If the AV control 329 is a heated seats feature, the AV control may include instructions that instruct the AV to turn on its heated seats, and may further specify a level (e.g., high, medium, or low) to set the seats on. It will be recognized here that the examples above are just a few of many different examples of features provided by AVs and control signals that control the performance of those features. Accordingly, the data store 325 may store many different AV controls 329 for many different changeable features on different types of AVs. Whenever the prediction module 309 predicts that a certain feature should be provided to a passenger, the AV control module 312 may generate and transmit the appropriate control command 320 to the AV so that the AV provides and/or changes the specified AV features.

Thus, each AV manufacturer may set its own restrictions and limitations on which features are available on each AV, which features are changeable, and may indicate how those features are changeable. In at least some embodiments, the computer system 301 may be configured to maintain a state machine for each AV. The individualized state machine may be designed to keep track of state information for each vehicle. As features are turned on, turned off, or otherwise adjusted, the AV may send updates to the computer system 301 which are then applied to state machine. Accordingly, each AV may have its own state machine that tracks the various available features for that AV and the current state of each of those features. Thus, for example, if a passenger wanted to change the interior lighting of the AV, the passenger could input the request or command through the electronic device 203 of FIG. 2A. The command may be sent directly to the AV, which would then change the lighting if that feature was available, or the command may be sent as a request to the computer system 301. The computer system 301 may then look up an appropriate application programming interface (API) or other command and send the lighting command signal update to the AV. Alternatively, in at least some cases, the AV manufacturer, owner, or other third party may retain control of the AV or at least some of its features. In such cases, the user's request for a feature to be changed may be routed to the manufacturer, owner, manager, or other third party, which can itself then send the (lighting) command signal update or determine that they do not want to make the change. Thus, each AV and/or each AV provider may be unique and may provide different levels of control for each feature provided by the AV.

In some cases, the computer system 301 may be configured to identify or generate customized logic for specific features of an AV, or features that are specific to one brand or provider of AVs. The customized logic may control certain functions or features that are unique to that specific AV or to that type of AV. The customized logic may interface with the AV, and may be presented in a manner that is understandable by the AV. The AV can then carry out specific commands using that logic. Additionally or alternatively, some AVs or AV features may be initialized or changed via common APIs that work for multiple different types of AVs or work with different AV manufacturers. For instance, an example of a common API may allow access to a radio tuner. This example common control API may allow access to the radio tuners of multiple different types of AVs. Similar APIs may be designed for other features in AV including trunk release mechanisms, automatic door closing mechanisms, HVAC systems, lighting systems, and other vehicle systems. In some cases, commands may be sent using these APIs to change state in AVs for certain features (referred to herein as push APIs). These push APIs may be two-way communications that are sent to third-party fleet managers and/or to the AVs directly.

In some embodiments, push APIs or other AV controls (e.g., 329) may differ from vehicle to vehicle. For instance, different AVs may implement different commands for the same feature. A command to change the interior cooling in one AV may not work in another AV. Similarly, a command to open the sunroof in one AV may not open the sunroof in another AV. Thus, the computer system 301 may maintain, in data store 325, a database of commands, APIs, customized logic, or other information regarding each AV specifically, and regarding each class of AVs, including specific makes, models, or manufacturers. The database may also track which conditions are necessary for certain features to be provided. For instance, in some cases, HVAC features may be provided before the AV leaves the pickup location, but other features such as changing the lighting or rolling down a window may not be provided until all seatbelts have been fastened, until each user has put a mask on, or until other conditions have been met. In some embodiments, the AV will not leave the pickup location until those preconditions are met. In other cases, depending on the condition, the AV may leave the pickup location but may not provide certain features until those conditions are met. Throughout this process a live assistant may be able to monitor the AV and further monitor the AV booking process. This process is generally shown from the perspective of the passenger and the ride assistant in FIGS. 6A-9D, as described below.

Figure 6A:
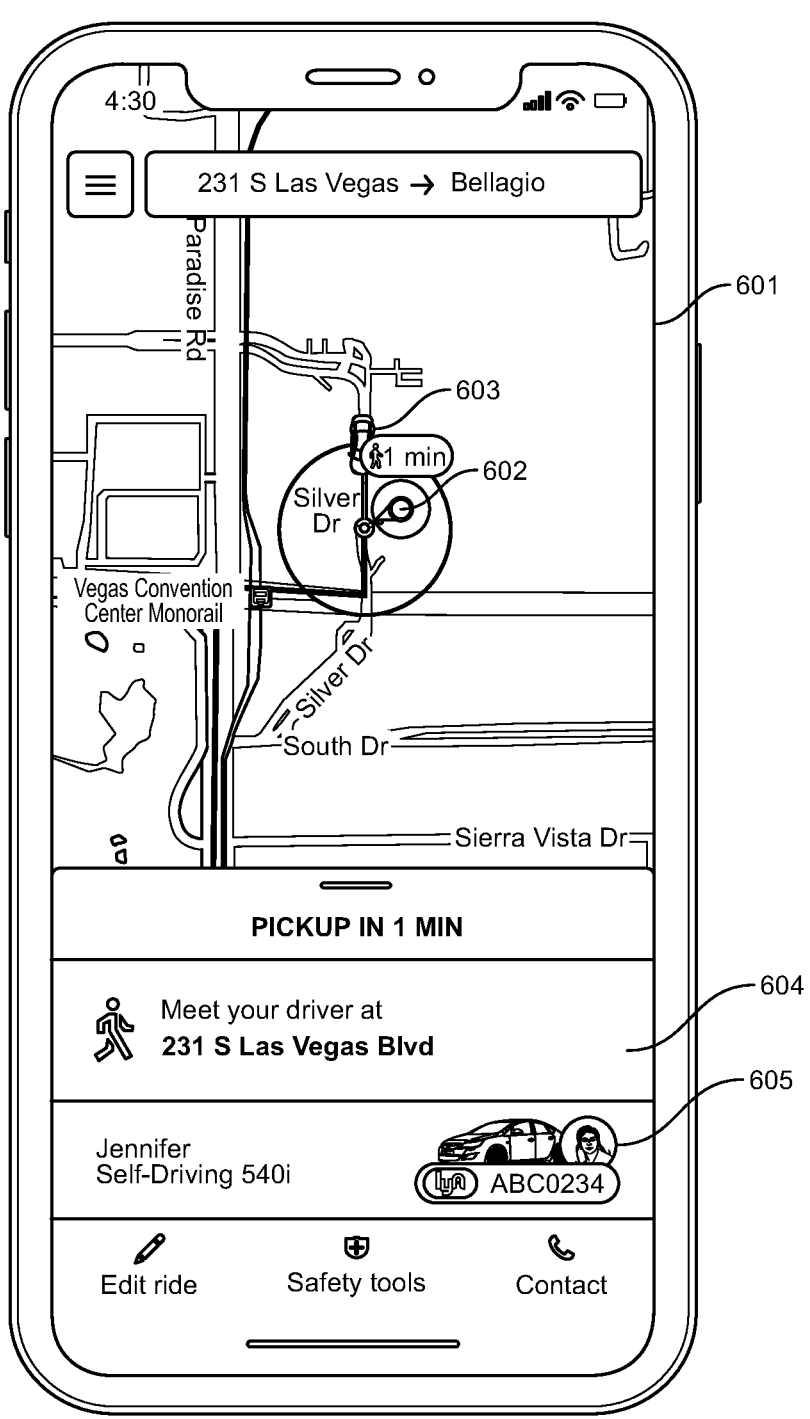
FIGS. 6A-6D illustrate an embodiment in which a passenger requests a ride from an AV.

FIG. 6A illustrates an embodiment of a user interface 601 that may be displayed on a passenger's smartphone, tablet, PC, smartwatch, or other electronic device. The user interface 601 may show the current location of the AV 603, along with the passenger's current location 602 and the pickup location. A UI element 604 may indicate where to meet the AV, while another UI element 605 may indicate the type of vehicle, the license plate number, and other information about the AV. Other information and tools may also be provided on the UI, including an indication of time to pickup, buttons to edit the requested ride, access safety tools, or contact a ride assistant may, or other UI elements.

Figure 6B:
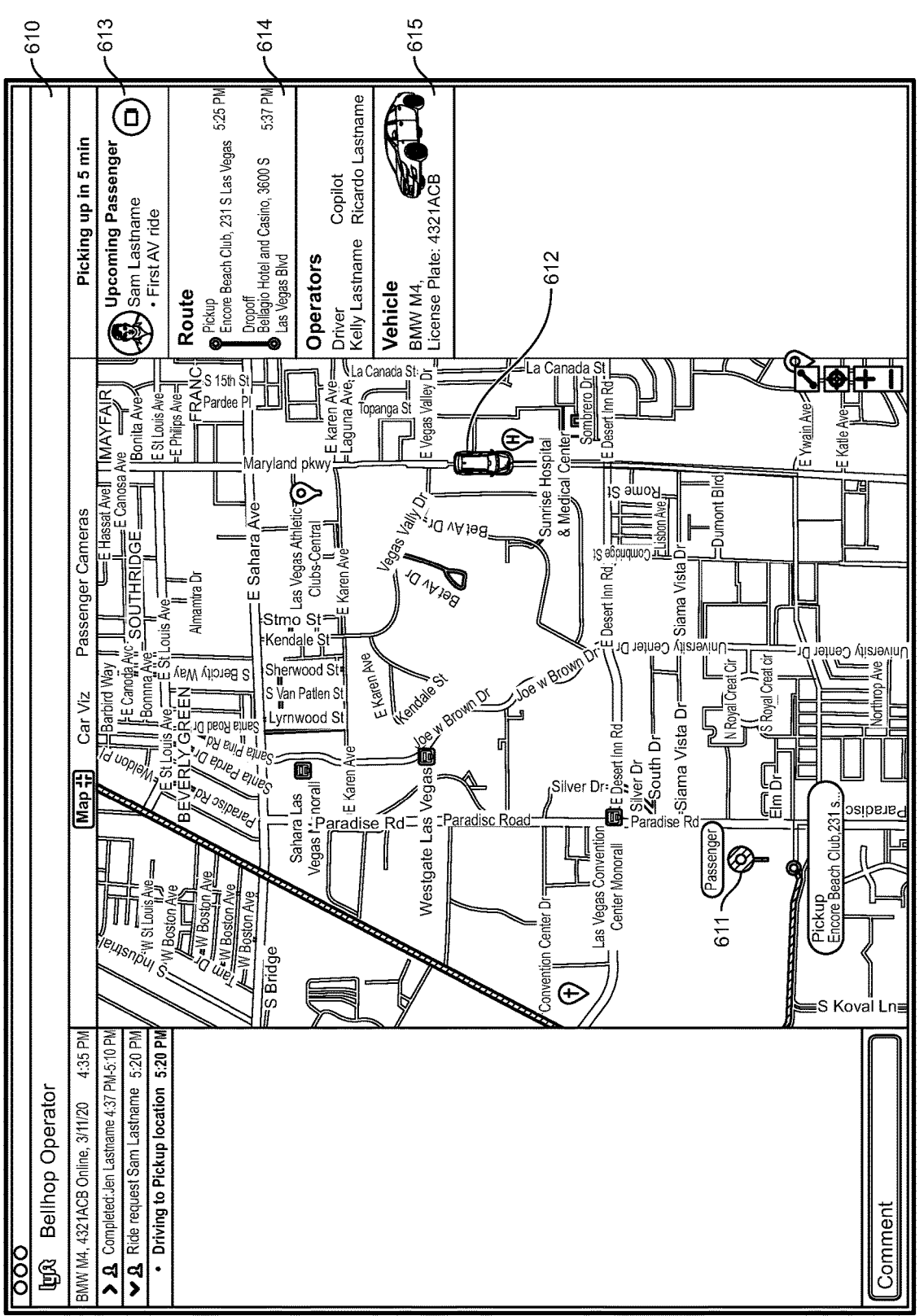

A ride assist agent, potentially working for the underlying transportation network or ridesharing provider, may see a ride assist agent's user interface 610 in FIG. 6B. Like the UI 601, the UI 610 may include an indication of the current location of an AV 612 (along with potentially other AVs in the area), as well as the current location 611 of the passenger. The ride assist agent's UI 610 may further include an indication of who the passenger is in UI element 613, along with a button that allows video (or strictly audio) communication with the passenger. UI element 614 may provide an indication of pickup and drop-off locations, while UI element 615 may provide an indication of the AV 612 that has been selected to pick up the passenger at location 611.

Figure 6C:
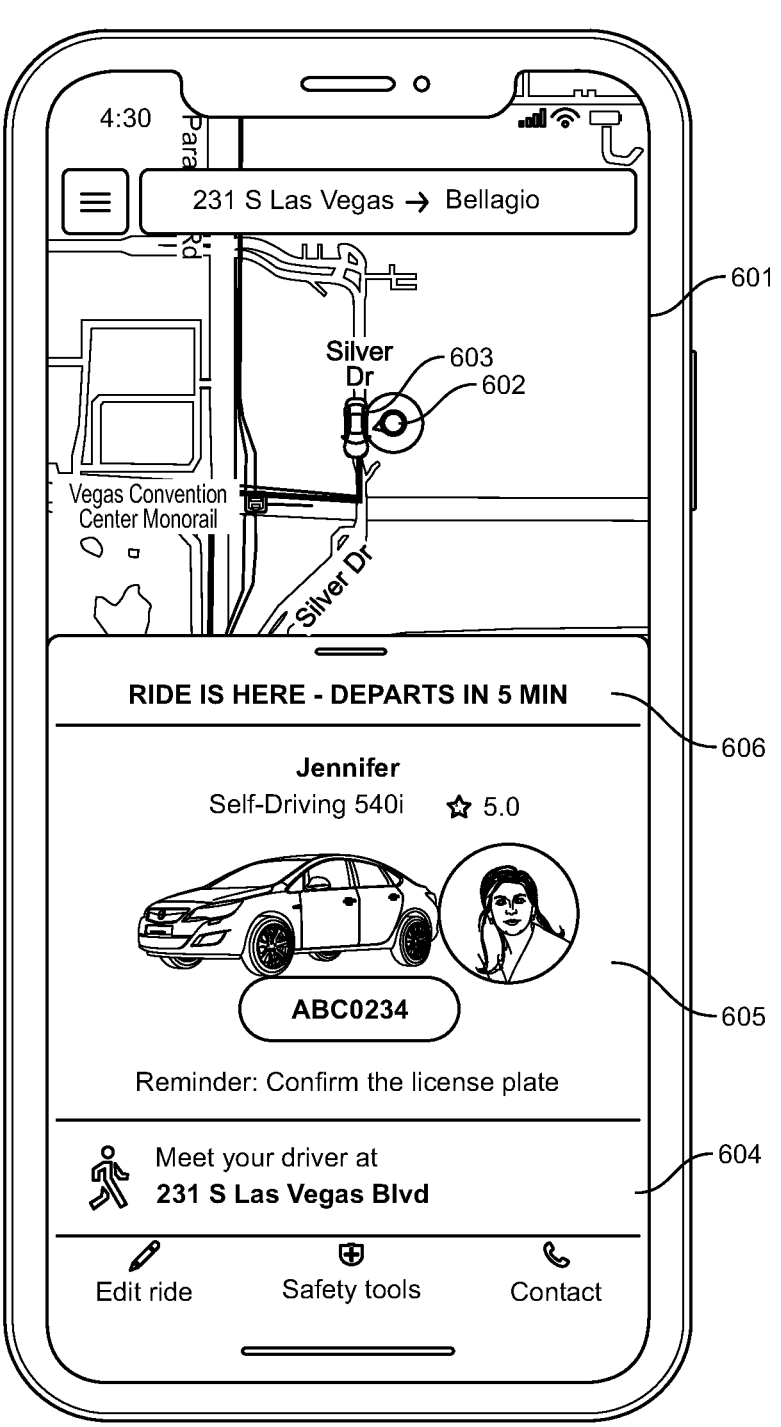
Figure 6D:
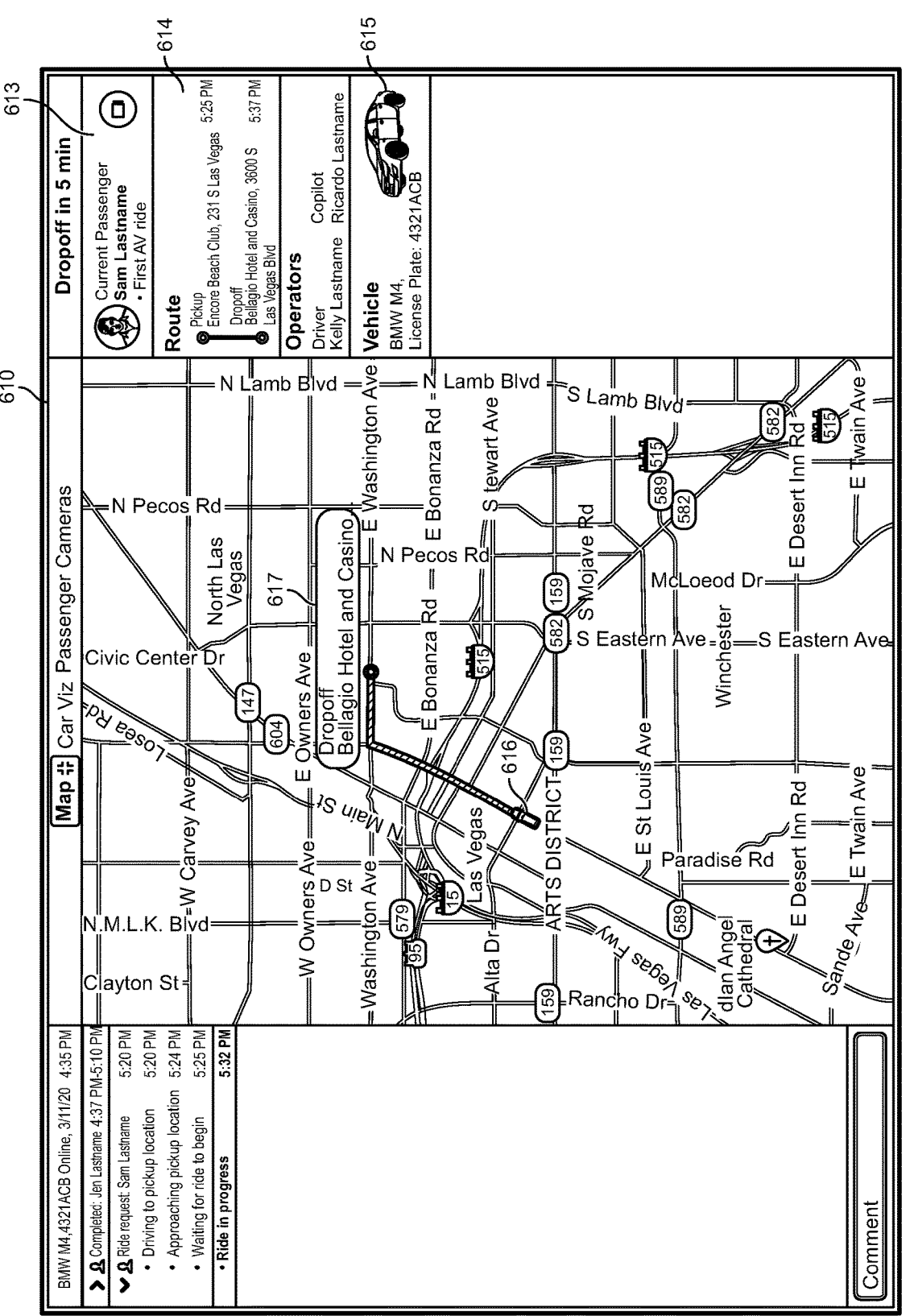

In FIGS. 6C and 6D, the AV has arrived to pick up the passenger. The UI element 606 indicates to the passenger that the AV is at the pickup location and is ready to depart.

UI element 605 provides an indication to the passenger of the vehicle and license plate, along with potentially the name and/or image of a ride assist agent that may help the passenger during their ride. FIG. 6D illustrates, on the ride assist agent's UI 610, the route that will be used to transport the passenger using the AV. The UI 610 may provide an indication of the current location 616 of the AV, along with a UI element depicting the drop-off location 617.

In some embodiments, the ride assist agent's UI 610 may be further configured to show information received from the AV, including sensor information. For instance, if the AV is configured with weight sensors and seat belt sensors, the AV may indicate whether the passenger in each seat is buckled in or not. If one or more of the passengers is not buckled in, the ride assist agent may send a notification to the passenger's electronic device or to an electronic device or audio/video system in the AV to generate audio cues or to provide a live video feed of the ride assist agent asking the passengers to buckle in. Additionally or alternatively, the ride assist agent's UI 610 may provide UI elements that show other sensor information including tire pressure information, sensor information indicating a total number of occupants, sensor information indicating that a passenger who was supposed to exit the AV has not exited, sensor information indicating that a door or trunk is still open, or sensor information from the engine or batteries indicating the operating status of the AV. If any of the sensor information indicates to the ride assist agent that the ride should not take place, the ride assist agent may use the UI 610 to send commands to the AV to stop the ride, or to close the open doors or trunk, or to provide an audio indication that passengers need to be seat belted in, etc. Thus, sensor information from a variety of different sensors on the AV may inform the ride assist agent of the vehicle's status and potential safety concerns. The ride assist agent may then react to these concerns and either resolve the issue or stop the ride. In some cases, the camera 210 of FIG. 2A may provide live video feed of the interior or exterior of the vehicle in the ride assist agent's UI 610 to further inform the agent on how to respond to a given situation.

Figure 7A:
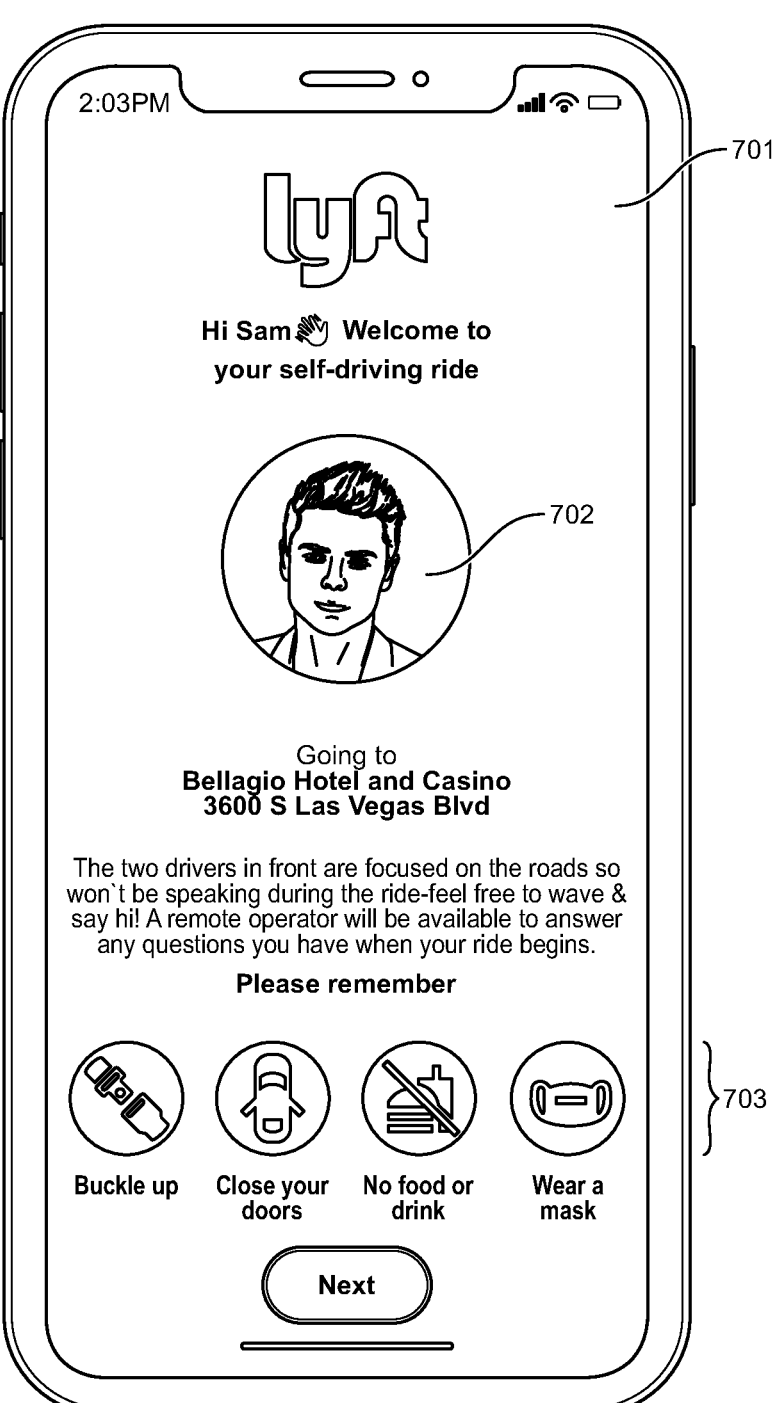
FIGS. 7A-7D illustrate an embodiment in which a passenger receives a ride from an AV.
Figure 7B:
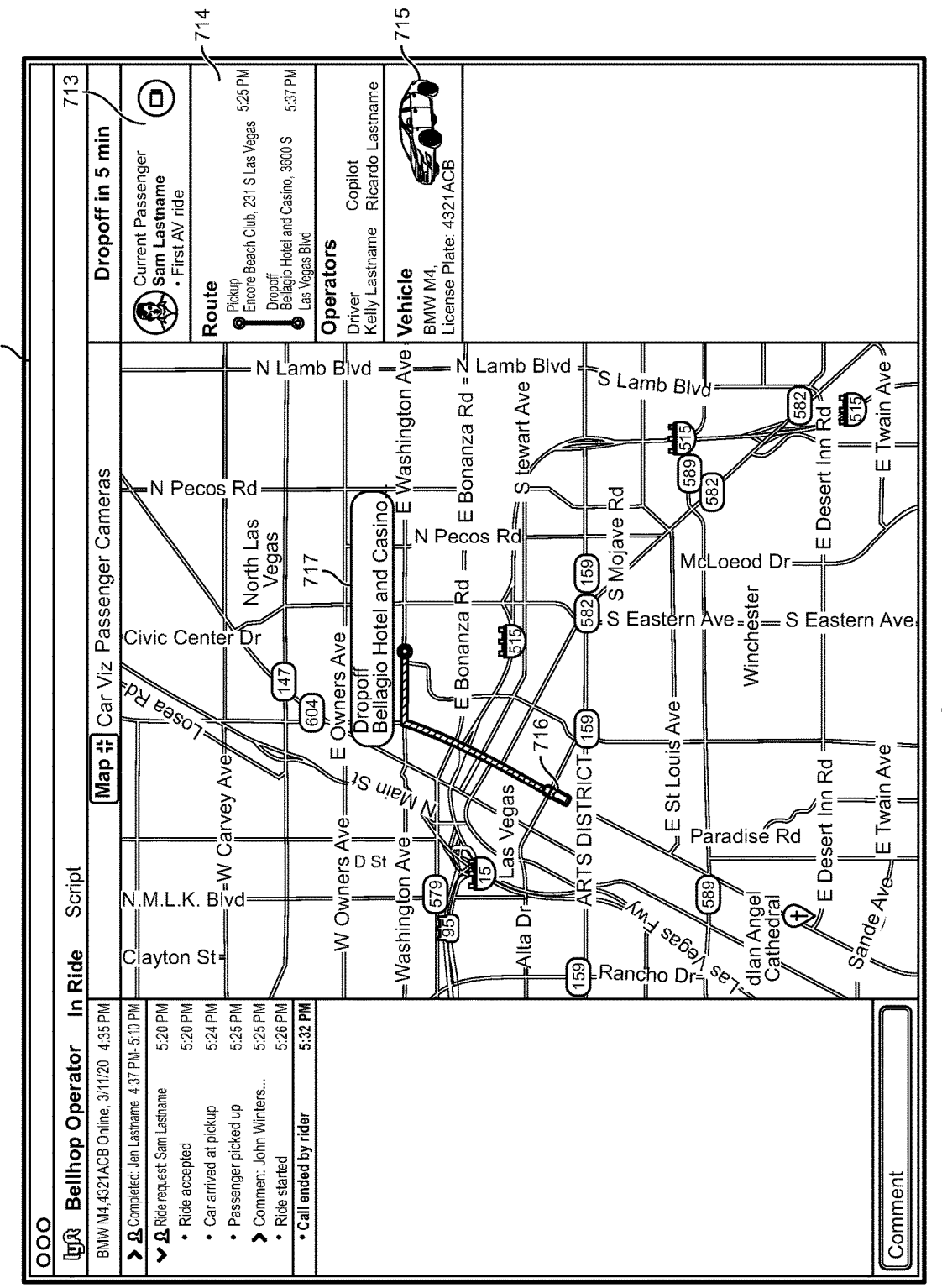
Figure 7C:
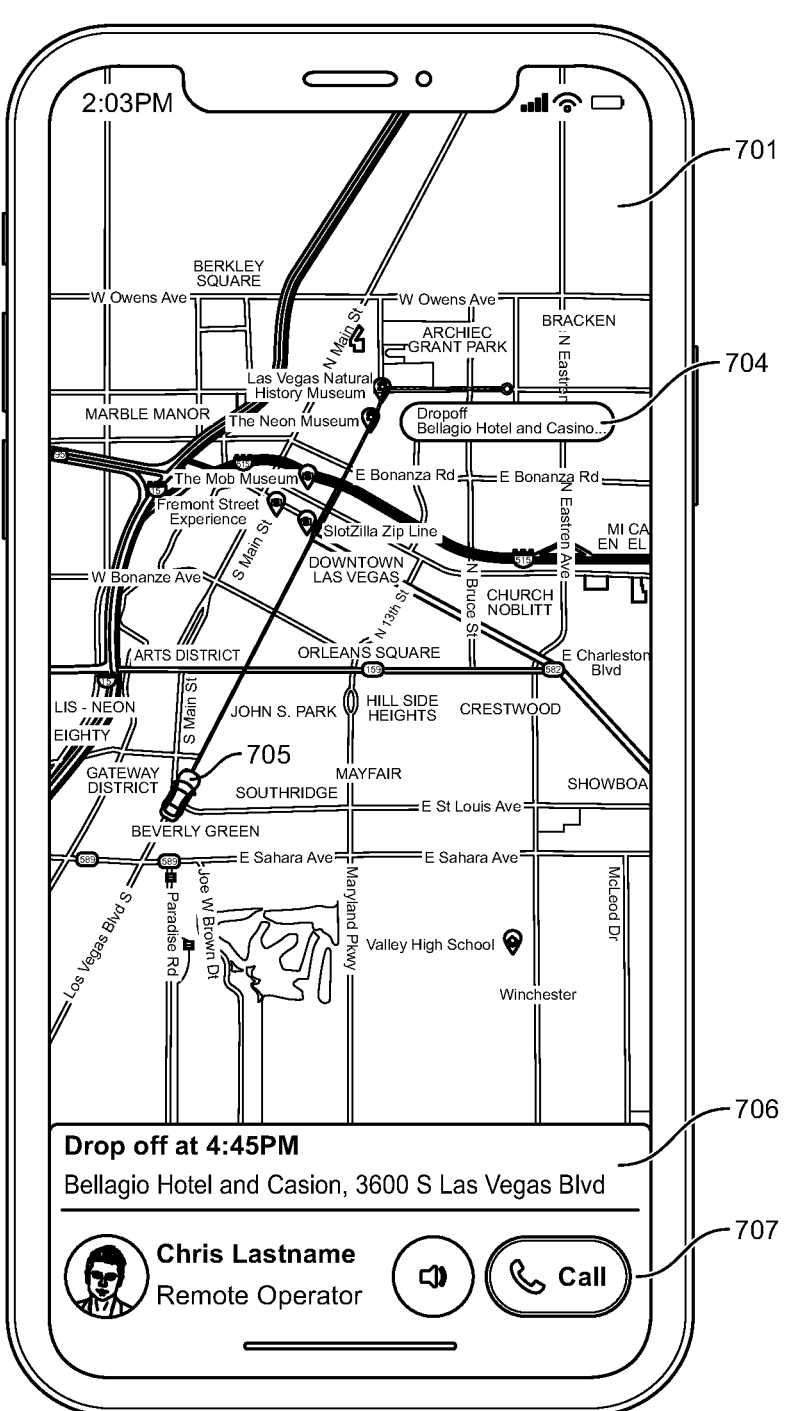
Figure 7D:
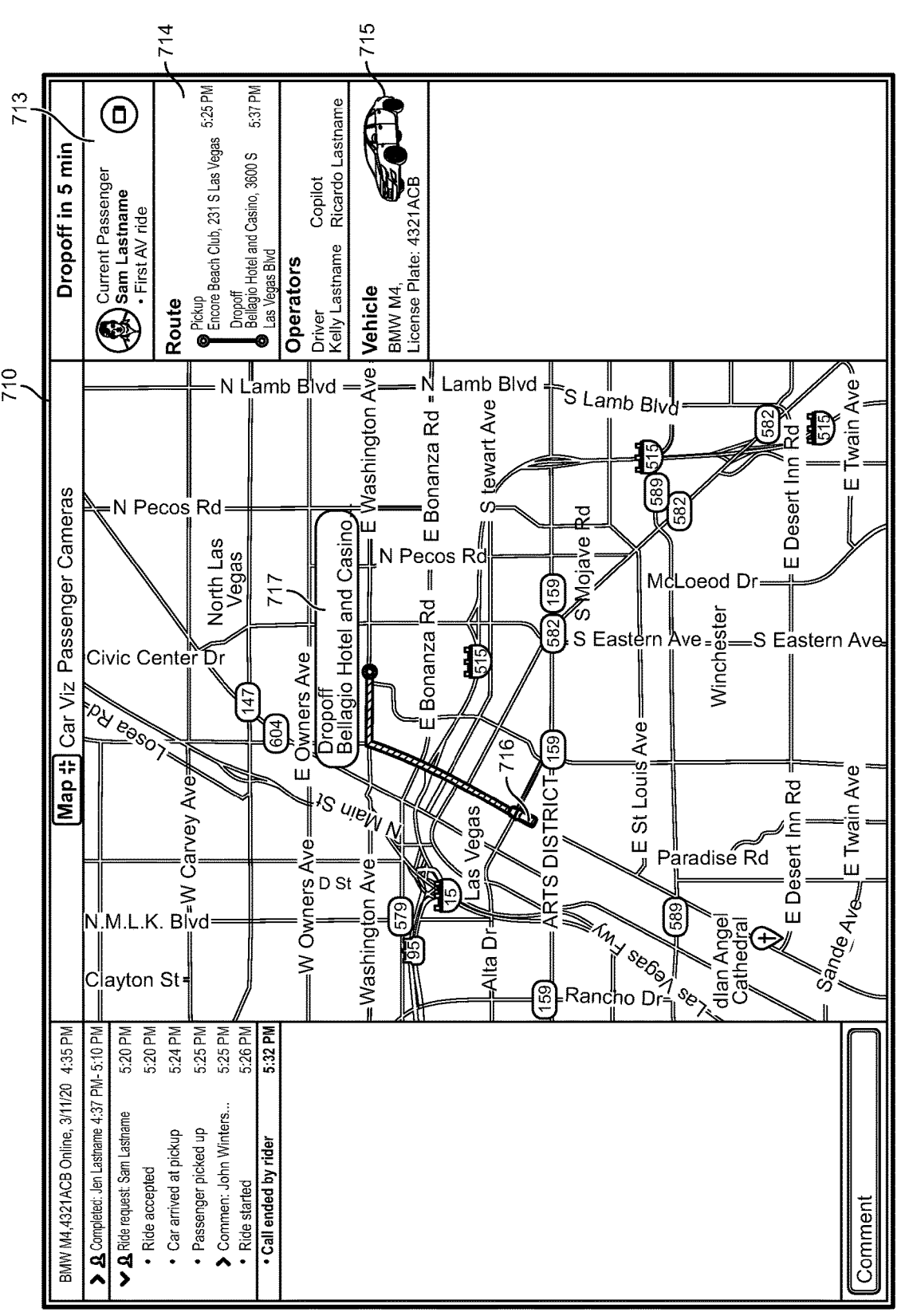

FIGS. 7A-7D illustrate example user interfaces that may be shown to passengers and ride assist agents once the ride is underway. For instance, FIG. 7A illustrates an example UI 701 that shows an image of the ride assist agent 702 that is available to help the passenger, or shows an image of a ridesharing provider who is in the AV to ensure that everything works properly. UI elements 703 may provide reminders to buckle up, close the door, to wear a mask, and to not eat or drink in the AV. The ride assist agent's UI 710 of FIG. 7B provides an indication of the AV's current location 716 and destination 717, along with indications of the current passenger 713, the designated route 714, and information about the AV 715. As the ride progresses, the passenger's UI 701 may be updated to show the AV's current location 705 and destination 704. Other UI elements may provide an indication of estimated time to drop-off 706, and may also provide a button 707 to call a ride assist agent. The ride assist agent may view the UI 710 in FIG. 7D to follow the AV as it travels toward the designated destination 717.

In some cases, before or during the ride, the passenger may desire to speak with a ride assist agent, potentially regarding the ride itself, the AV or its features, things to do in the area, to resolve safety concerns, or for other reasons. In such cases, the passenger may use call button 805 in UI 801 of FIG. 8A to make a call (either via video or audio only) to a ride assist agent. As in previous examples, the UI 801 may show a current indication of the AV's location 803, an indication of the planned drop-off location 802, and an indication of the estimated drop-off time 804. When the user hits the call button 805, the user is connected to the ride assist agent. The ride assist agent sees, in their UI 810 of FIG. 8B, that a video or audio call is coming from the AV passenger Sam Lastname. The UI 810 may also show indications of the current route 814, the AV being used 815, the current location of the AV 816, and the designated drop-off location 817. The ride assist agent may use UI element 813 to pick up the call from the passenger.

Figure 8A:
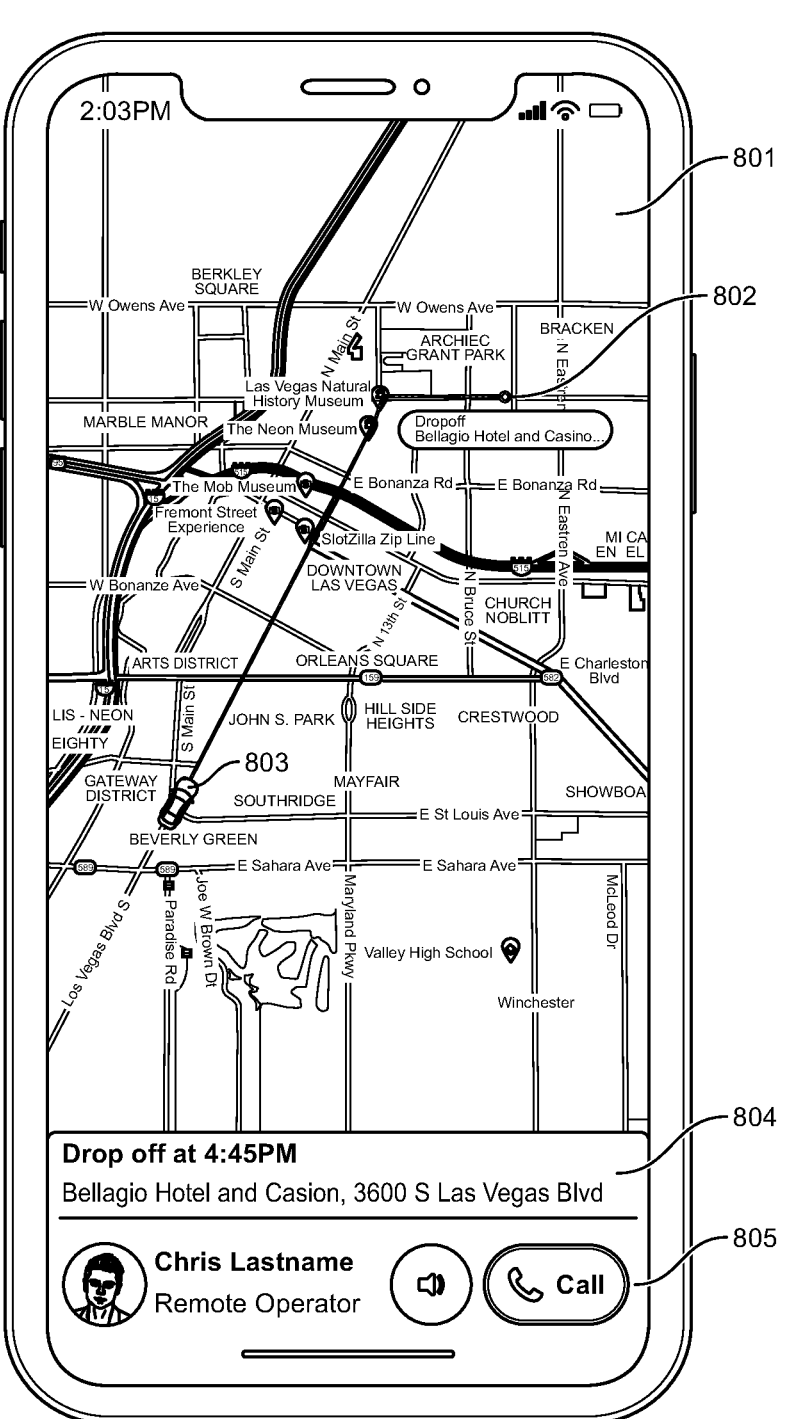
FIGS. 8A-8F illustrate an embodiment in which a passenger conducts live communication with a remote agent during transportation.
Figure 8B:
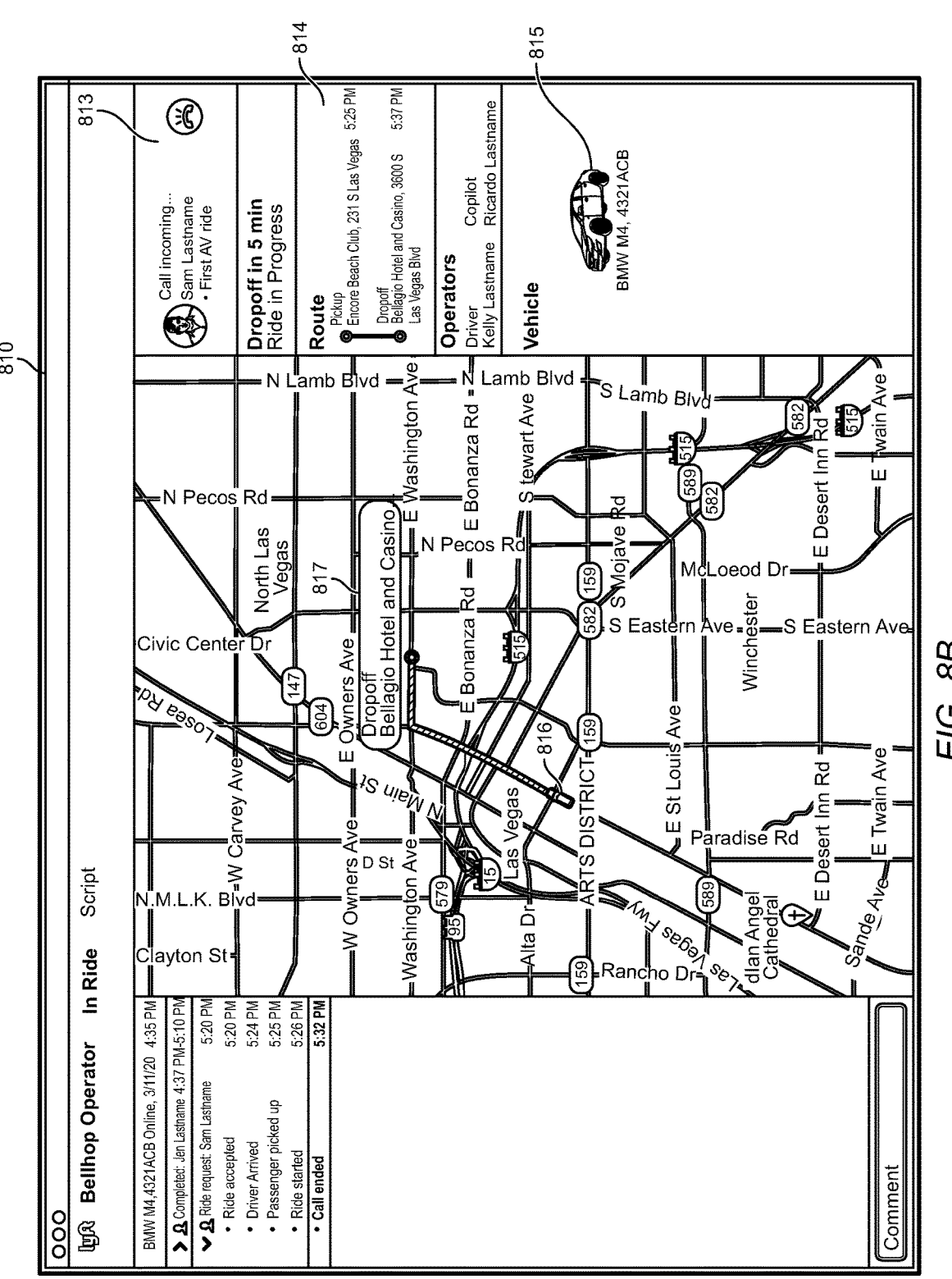
Figure 8C:
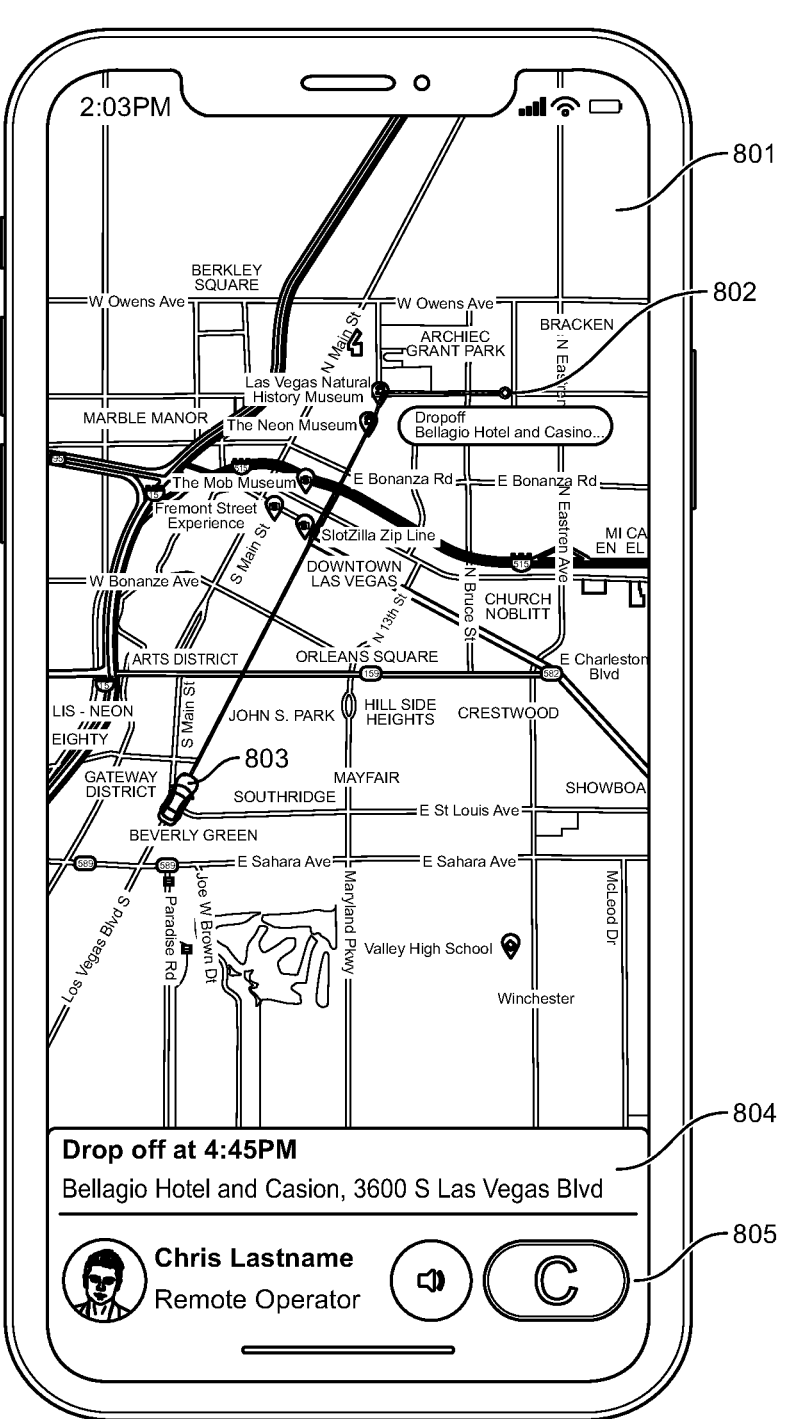
Figure 8D:
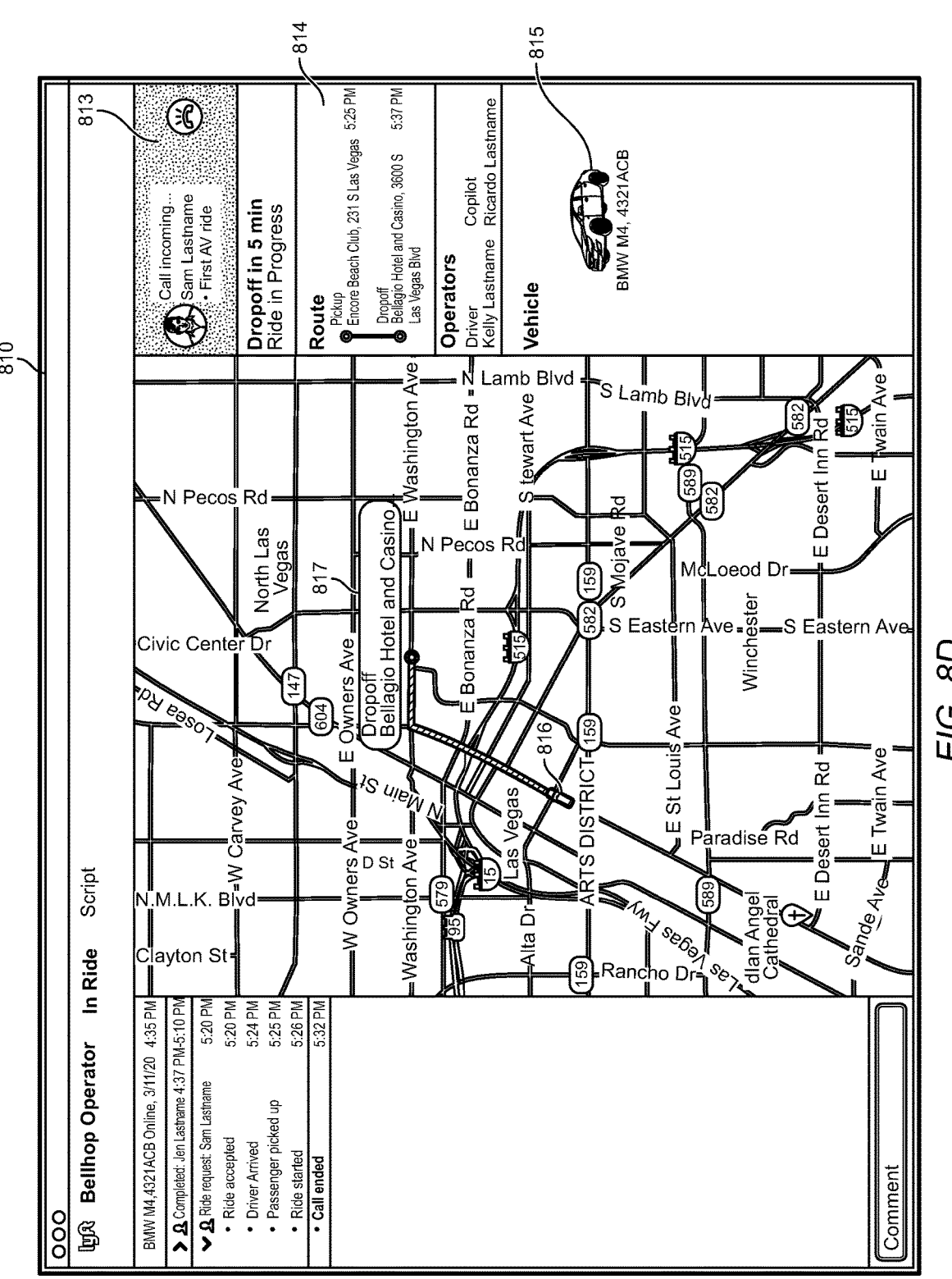
Figure 8E:
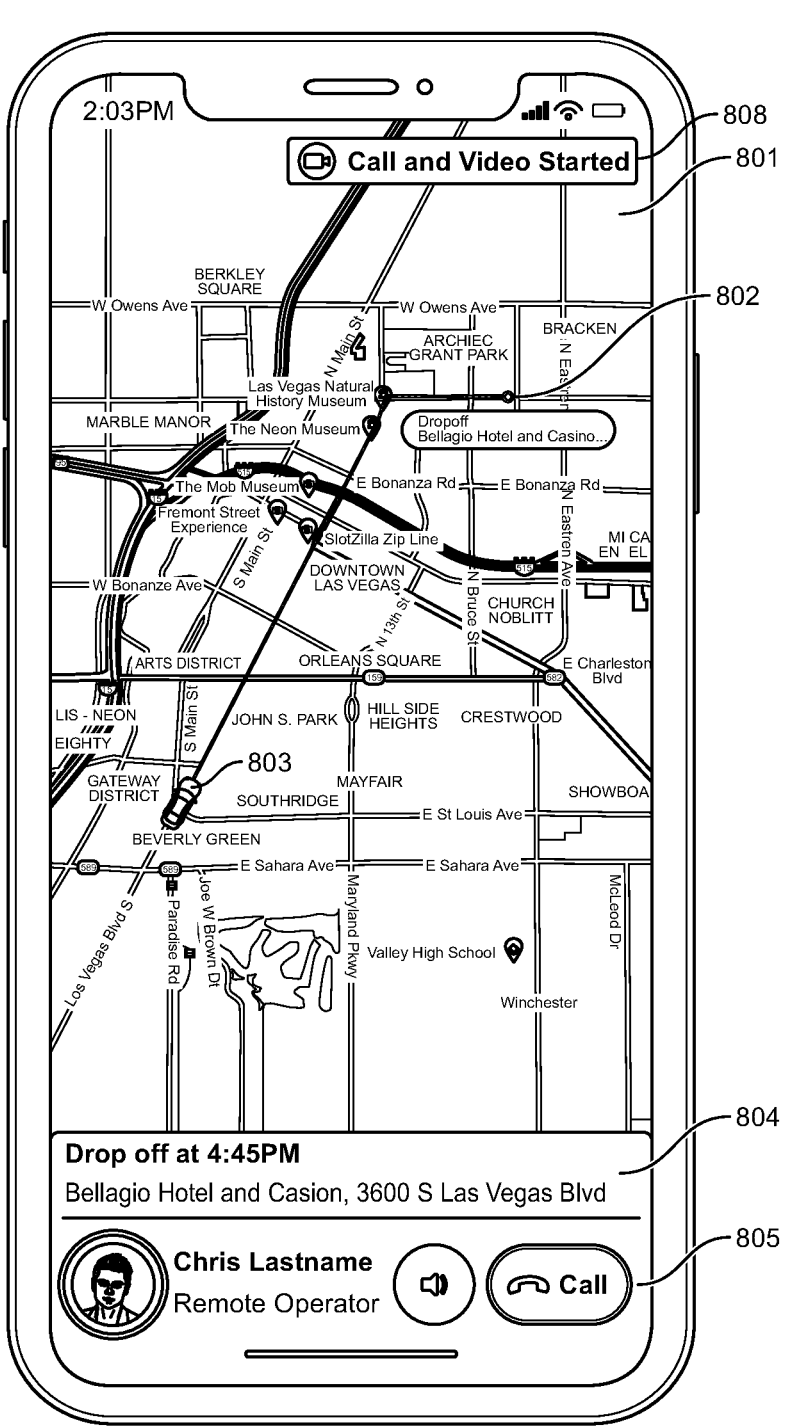
Figure 8F:
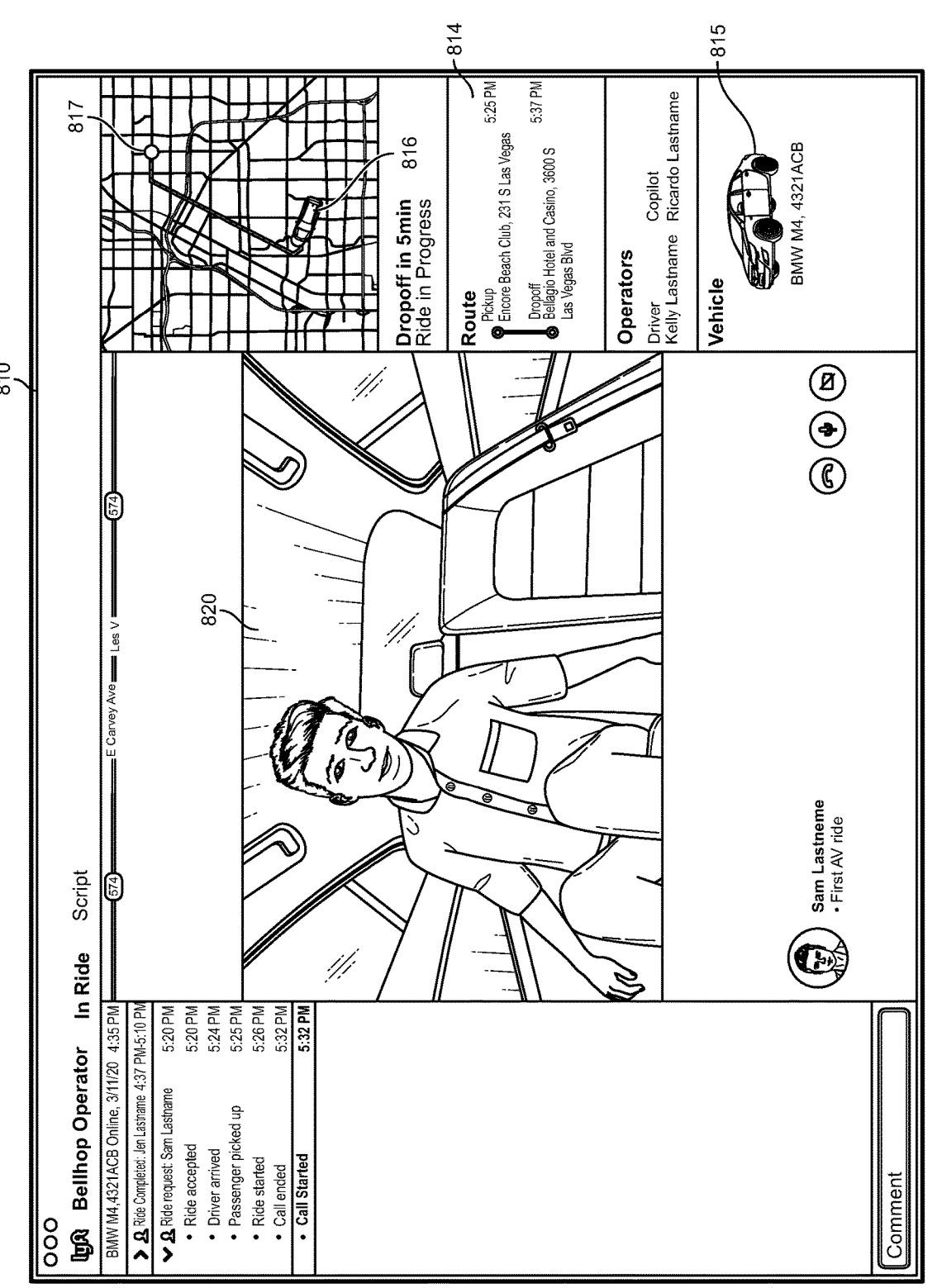

While the call is attempting to connect, the call button 805 on the passenger's UI 801 may change to indicate that the connection is being established, as shown in FIG. 8C. The ride assist agent's UI 810 may similarly be updated to show, in UI element 813, that the call is being established. Once the connection is established, the passenger's UI 801 may display an indicator 808 showing that the call or video has started, as shown in FIG. 8E, and as shown in FIG. 8F, the ride assist agent's UI 810 may show a video feed 820 of the passenger sitting in the AV. In this embodiment, the map showing AV 816's current location and drop-off location 817 has been moved to the upper right corner so the call with the passenger can take priority.

Figure 9A:
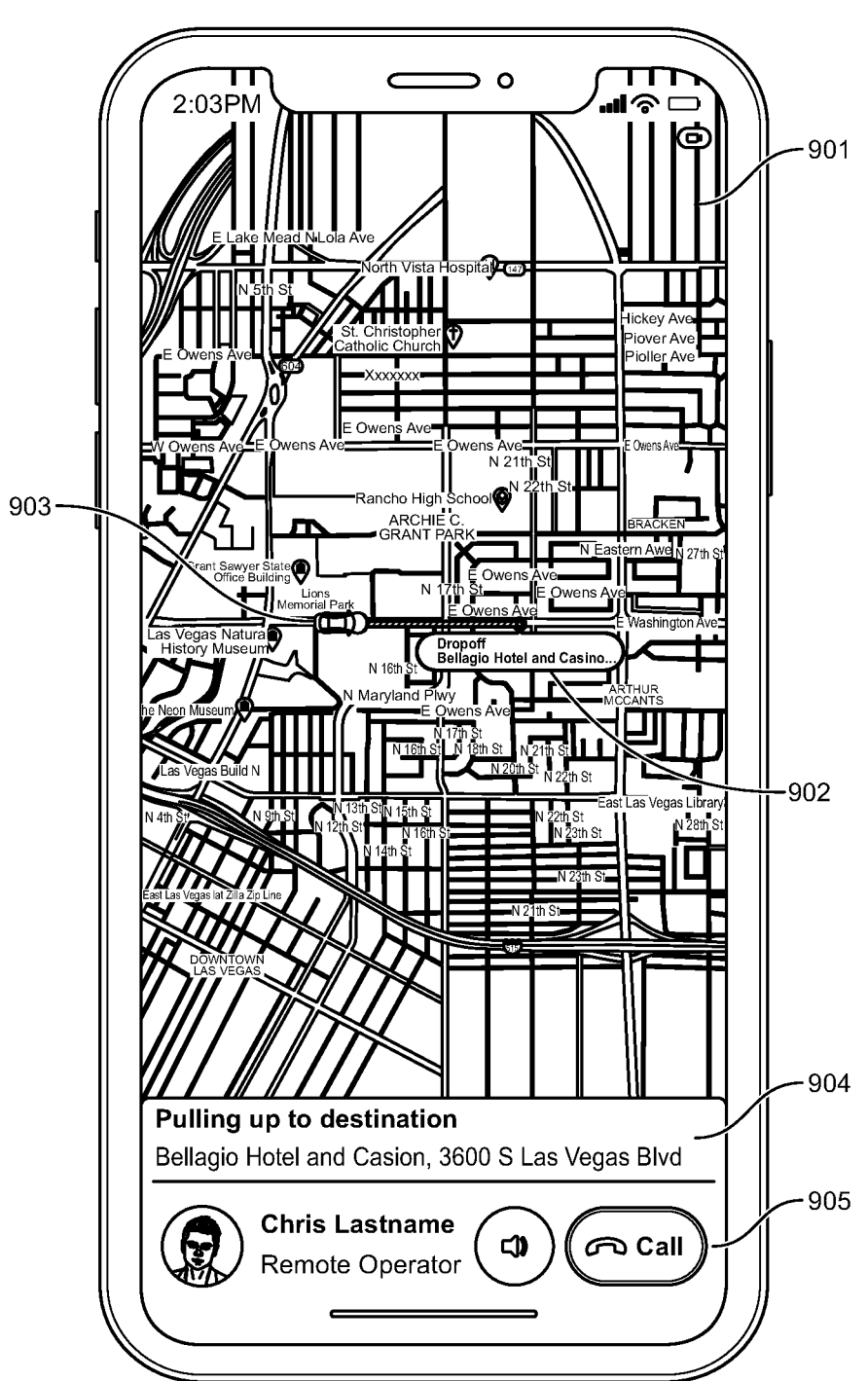
FIGS. 9A-9D illustrate an embodiment in which a passenger completes a ride from an AV.
Figure 9B:
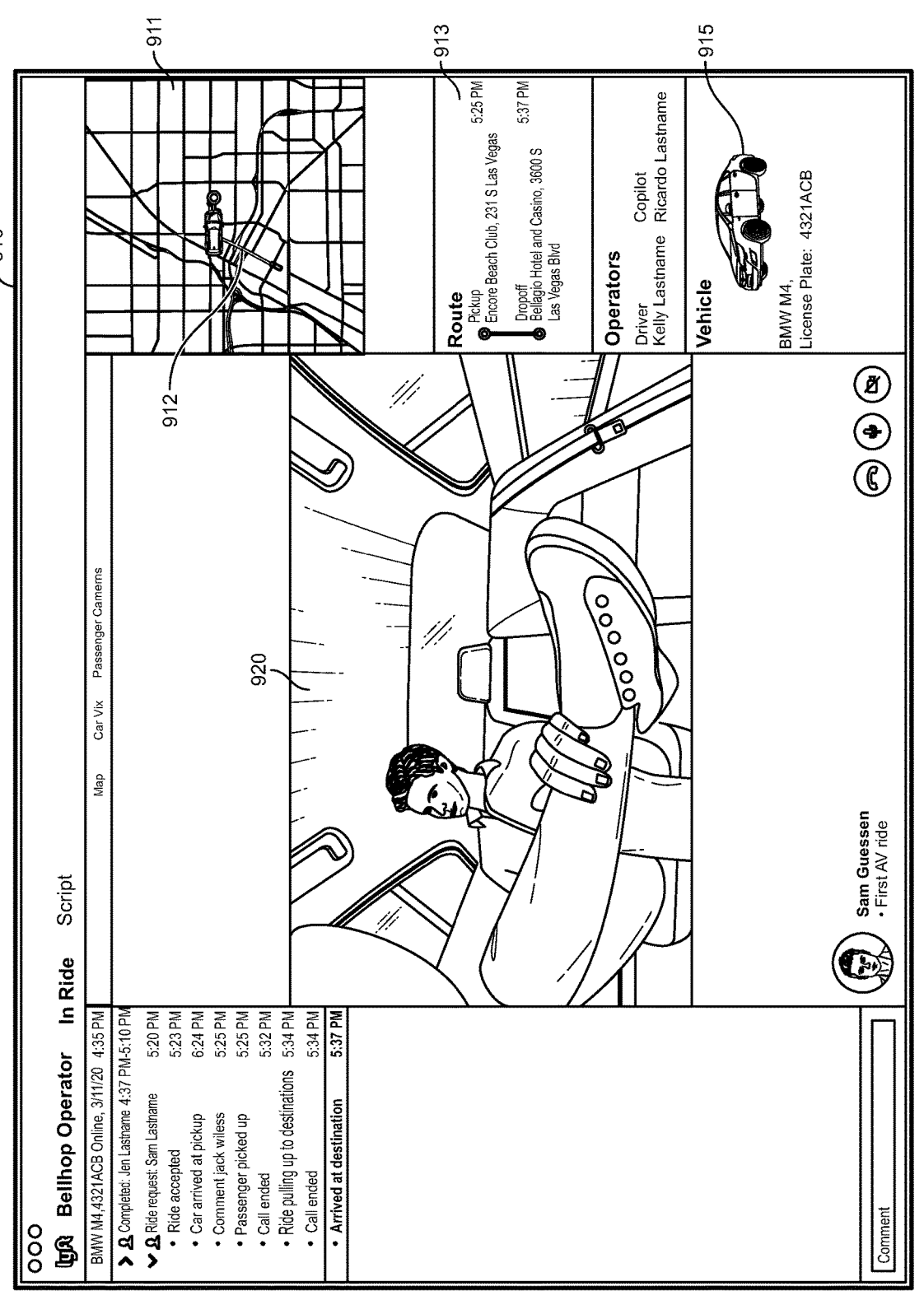
Figure 9C:
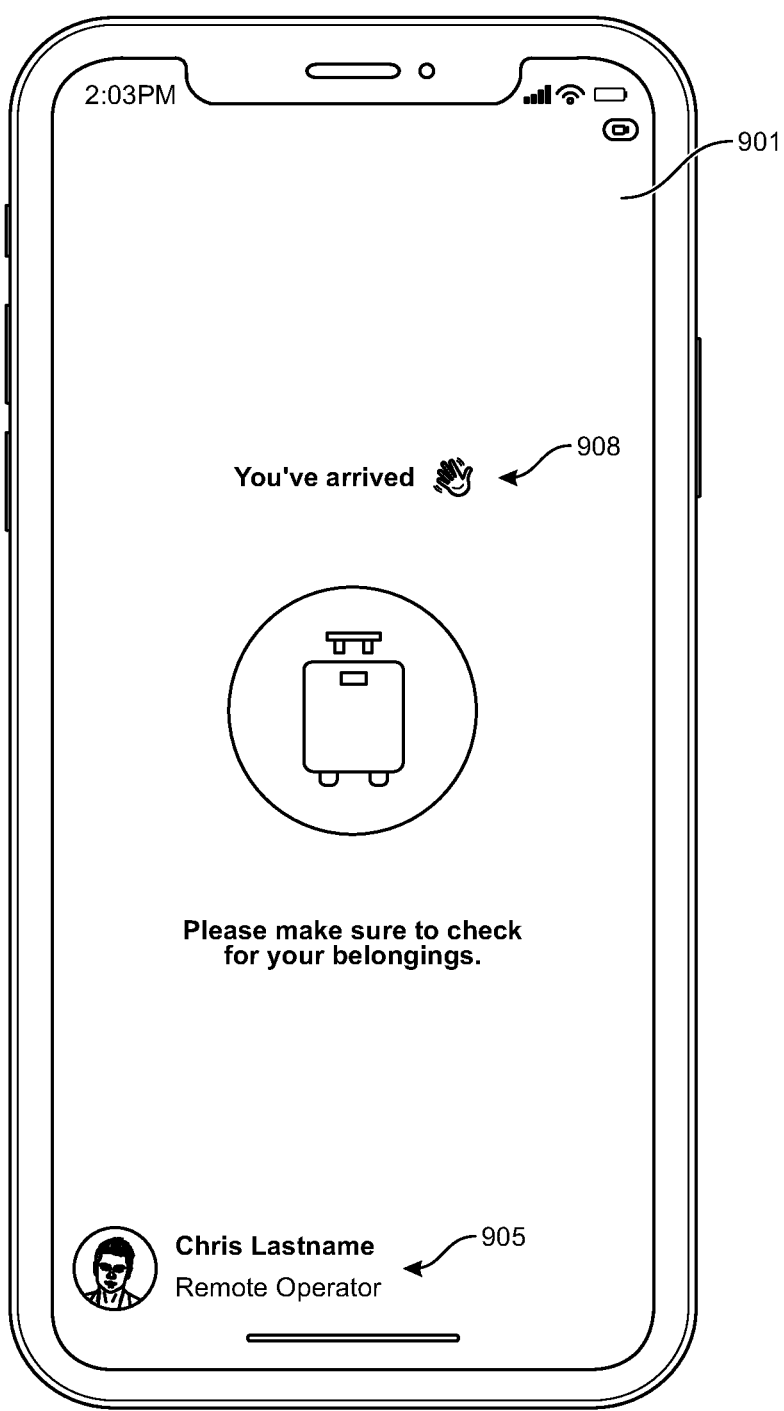
Figure 9D:
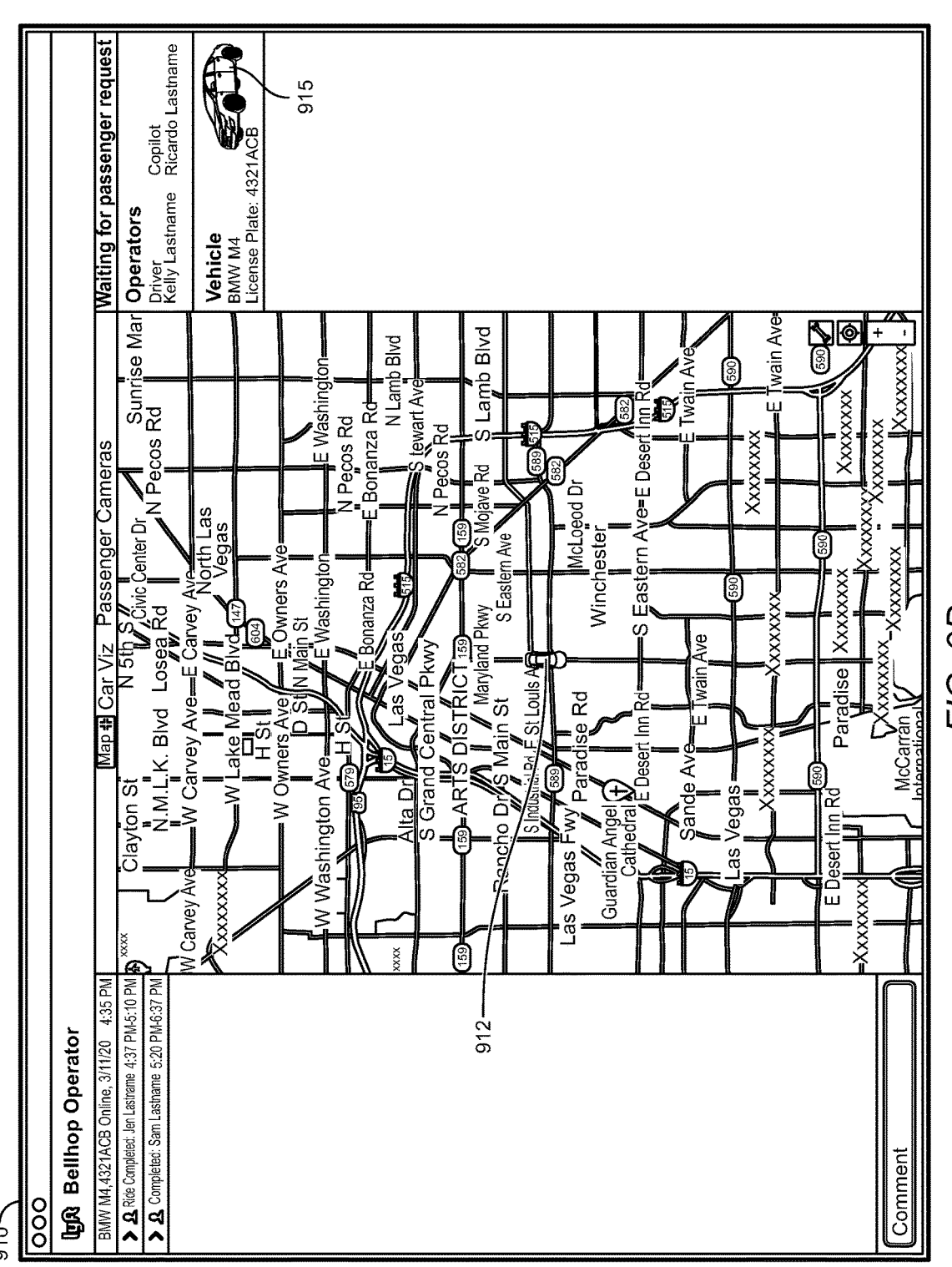

As the ride continues, the AV may approach its destination. The passenger's UI 901 in FIG. 9A shows in the AV's current location 903 that it is approaching its destination 902. The UI element 904 further indicates to the passenger that they are pulling up to their destination. This information may be shown to the passenger while they are on a call with a ride assist agent. The ride assist agent may see, in UI 910 of FIG. 9B, that the AV 912 is approaching its drop-off location in map 911, and may further see a route indicator 913, and information about the AV 915. The ride assist agent may see a video feed 920 of the passenger, and may watch the feed to ensure that the passenger exits the AV upon reaching the drop-off location. Once the passenger has arrived, the passenger's UI 901 may show, in FIG. 9C, an indication 908 that they have arrived and to be sure to grab their belongings.

The UI 901 may also show an indication 905 of the ride assist agent, who may still be connected via phone or video two-way communication. Once the passenger has exited the AV and has ended the call with the ride assist agent, the ride assist agent's UI 910 may return to a map that shows the current location of the AV 912, along with information about the AV 915, but lacking any information about a route or passenger. In some cases, instead of ending the call when the rider exits the AV, the call with the ride assist agent may be transferred to the rider's smartphone. This transfer may occur during the ride at any time, or may, in some cases, be initiated on the rider's smartphone. Thus, even if the call to the ride assist agent is started on the electronic device in the AV, the call may be transferred to and completed on the rider's smartphone, watch, or other electronic device.

In some cases, the passenger may be matched with a particular ride assist agent. For example, instead of being matched with a random ride assist agent or with the next available ride assist agent, the passenger may be matched with a ride assist agent that knows the passenger and/or knows the passenger's ridesharing preferences. Over time, a ride assist agent may get to know some of the passengers that use the AV ridesharing service. The ride assist agent may learn, for example, that a particular rider likes to ride alone, without any other passengers, and with the air conditioning turned up. The ride assist agent may also know that the rider prefers a specific radio station, and prefers a specific route to the airport or to their home. In such cases, the ride assist agent may control one or more features of the AV in real-time. The ride assist agent may use a UI (e.g., UI 610 of FIG. 6B) to send AV controls (e.g., 329) to the AV to pre-tune to the known preferred radio station, or to alter a chosen route to conform to the rider's preferred route, or may access the AV's HVAC system to turn up the air conditioning as part of a response to an event. In this manner, the ride assist agent may, after determining which passenger is about to take a ride in the AV, adjust various features of the AV to suit that passenger on subsequent events.

Still further, the ride assist agent may use the user interface 610 to monitor the passenger's ride from the initial request to the drop-off. For instance, as soon as the passenger has requested an AV ride, the ride assist agent may begin tracking the passenger's location. If the passenger is having trouble finding the AV, or is having trouble authenticating to the ridesharing program, or is having trouble getting their seat belt to buckle, the ride assist agent may send notifications to the user's device, or may control the AV to direct it to a new location closer to the passenger, or may take other actions to provide a better experience for the passenger. If the transportation management system determines that the passenger is having trouble of some kind, the ride assist agent's UI may display lights (green, yellow, or red), or other indicators indicating how well the ride experience is deemed to be going. If the ride experience is deemed to be going well, the UI may display a green light, if ambiguous, a yellow light, and if poorly, a red light. Thus, based on cues from the passenger, or based on sensor input from the AV, or based on information gleaned from the passenger's device, the ride assist agent's UI may provide an indication of how well the overall ride experience is going. The ride assist agent may then use the various alert levels to prioritize one AV ride over another. For example, if the ride assist agent is monitoring multiple AV riders at the same time, the ride assist agent may first turn their attention to riders that have a red or yellow light, while potentially paying less attention to the riders with green lights. If the lights change color, the ride assist agent may bump that passenger with the new red or yellow light to the top of the queue.

In some cases, the ride assist agent's UI may provide safety indicators, indicating that a rider has removed their seatbelt, or that a rider has opened a door while the AV is moving, or has unlocked the doors during travel. Indeed, the status of each AV, including the status of its safety features, the status of its engine and/or transmission, the status of its electrical system, the status of its recommended maintenance, and other information may be provided in the ride assist agent's UI. Still further, the UI may notify the ride assist agent that a rider has left an item such as a phone or a coat (e.g., based on live feed camera data), that a rider is sleeping in the AV and has not gotten out, that too many people have gotten into the AV such that the AV exceeds capacity, that a rider has pressed a "Passenger Status" button (e.g., 207 of FIG. 2D) on an electrical device within the AV, that a rider has called a ride assist agent for live assistance, or may provide other information related to the riders safety, comfort, or other preferences. In some cases, riders may have a history of problems when riding in an AV, or may have a history of not following the ridesharing rules. In such cases, the ride assist agent's UI may provide a predictive alert indicating that problems may occur with this rider, and that the agent should be on high alert while monitoring that rider. In some cases, the ride assist agent may be able to activate additional cameras within the AV to monitor the rider's actions and ensure they are keeping the known rules regarding shared travel. Still further, the ride assist agent may be able to control the AV, including instructing it to pull over, return to a designated location, slow its rate of travel, or otherwise take control of the ride to ensure the safety and wellbeing of all riders.

In some embodiments, the passenger's UI and the ride assist agent's UI are provided by an underlying transportation management system. The transportation management system may receive information from these user interfaces, as well as inputs received from the passenger through the electronic device in the AV (e.g., 203 of FIG. 2A). The transportation management system may be in communication with the ride assist agent to receive this information, and may make changes to an underlying transportation network based on interactions between the passenger and the ride assist agent. For instance, if the ride assist agent is receiving multiple assistance requests from riders within a given area, the transportation management system may determine that more people are traveling to that area. As such, the transportation management system may use this information to predict increased demand in that area, and may take one or more specific actions.

For instance, in response to information from the ride assist agent, the transportation management system may send more AVs or other vehicles to a given location to assist with ridesharing demand. This may reduce the amount of time a given AV sits idle, and may increase ridership across the transportation network. In another example, a ride assist agent may determine that a specific route is currently very popular (e.g., a route to a downtown event center). A corresponding number of AVs may then be sent to potential riders along that route in case those would-be passengers ultimately request a ride. Similarly, if the transportation management system determines that a given event is about to finish, it may send control signals to AVs in the area to concentrate around the area in which the event took place. Within this rubric, the ride assist agents or the transportation management system may determine the optimal drop-off and pickup locations. These locations may be areas that allow AVs and have room for rider pickup, for example. Accordingly, in this manner, the transportation management system may take information and data points from the ride assist agents and use that information to increase efficiency among the AVs, routing them to optimal locations, optimal pickup and drop-off spots, and at optimal times relative to other traffic on the streets.

Figure 10:
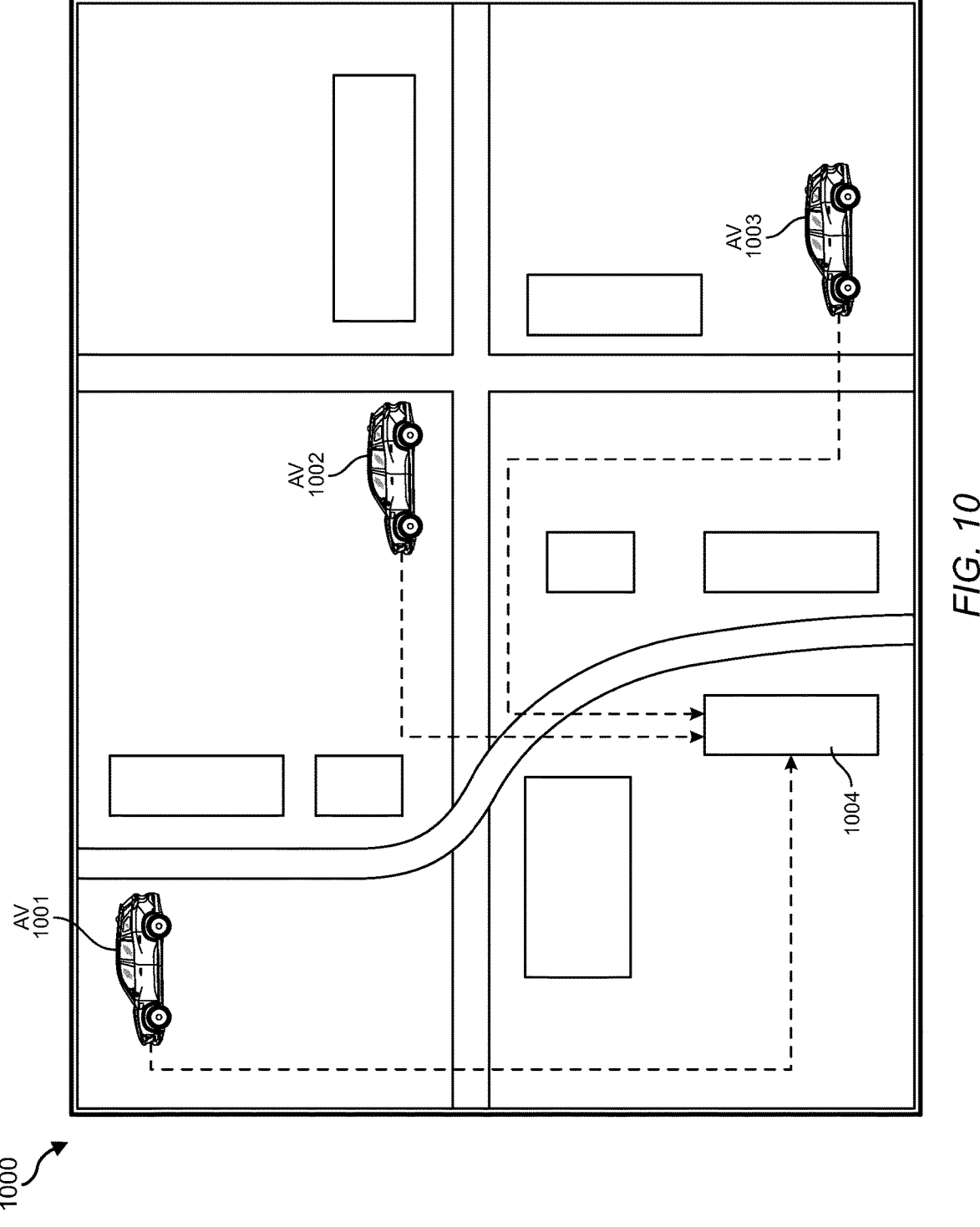
FIG. 10 illustrates an embodiment in which a transportation management system makes changes to an underlying transportation network based on interactions between a passenger and a remote agent.

Thus, as shown in embodiment 1000 of FIG. 10, if a ride assist agent determines that multiple AVs (e.g., AV 1001 and 1002) are going to a specific building or area 1004, the transportation management system may begin to route AV 1003 and potentially other AVs to the streets and parking areas around 1004. By controlling the AV 1003 to drive to the area around 1004, the likelihood of AV 1003 being used for transport may increase. Moreover, these predictive movements and placements of AVs may reduce AV downtime, may increase ridership, and may increase efficiency of the transportation management system as a whole.

In addition to the system described above, a method may be provided that includes monitoring, during an autonomous vehicle (AV) ride provided by an AV carrying a passenger and managed by a transportation management system configured to manage a fleet of AVs, various passenger communications between the passenger and a remote agent using an in-vehicle electronic device in the AV. The remote agent may be located external to the AV, and the in-vehicle electronic device may enable communication between the remote agent and the passenger during the AV ride. The method may also include identifying, based on a request provided by the passenger to the remote agent using the in-vehicle electronic device and in association with a first occurrence of a ride event during the AV ride, various passenger ride preferences related to the AV ride. The method may further include providing confirmation, via the in-vehicle electronic device and subsequent to the remote agent receiving the request provided by the passenger in association with the first occurrence of the ride event, that the at least one request is being fulfilled, the fulfillment of which causes a change to the AV ride based on the passenger ride preferences. The method may also include generating, based upon the request provided by the passenger to the remote agent, various predicted passenger ride preferences for the passenger. During a subsequent AV ride carrying the passenger, the predicted passenger ride preferences may be capable of being applied to the subsequent AV ride in association with a second occurrence of the ride event.

Additionally or alternatively, a computer-readable medium may be provided that includes computer-readable instructions that, when executed by at least one processor of a computing device, cause the computing device to: monitor, during an autonomous vehicle (AV) ride provided by an AV carrying a passenger and managed by a transportation management system configured to manage a fleet of AVs, various passenger communications between the passenger and a remote agent using an in-vehicle electronic device in the AV. The remote agent may be located external to the AV, and the in-vehicle electronic device may enable communication between the remote agent and the passenger during the AV ride. The computing device may also identify, based on a request provided by the passenger to the remote agent using the in-vehicle electronic device and in association with a first occurrence of a ride event during the AV ride, various passenger ride preferences related to the AV ride. The computing device may further provide confirmation, via the in-vehicle electronic device and subsequent to the remote agent receiving the request provided by the passenger in association with the first occurrence of the ride event, that the at least one request is being fulfilled, the fulfillment of which causes a change to the AV ride based on the passenger ride preferences. The computing device may also generate, based upon the request provided by the passenger to the remote agent, various predicted passenger ride preferences for the passenger. During a subsequent AV ride carrying the passenger, the predicted passenger ride preferences may be capable of being applied to the subsequent AV ride in association with a second occurrence of the ride event.

Figure 11:
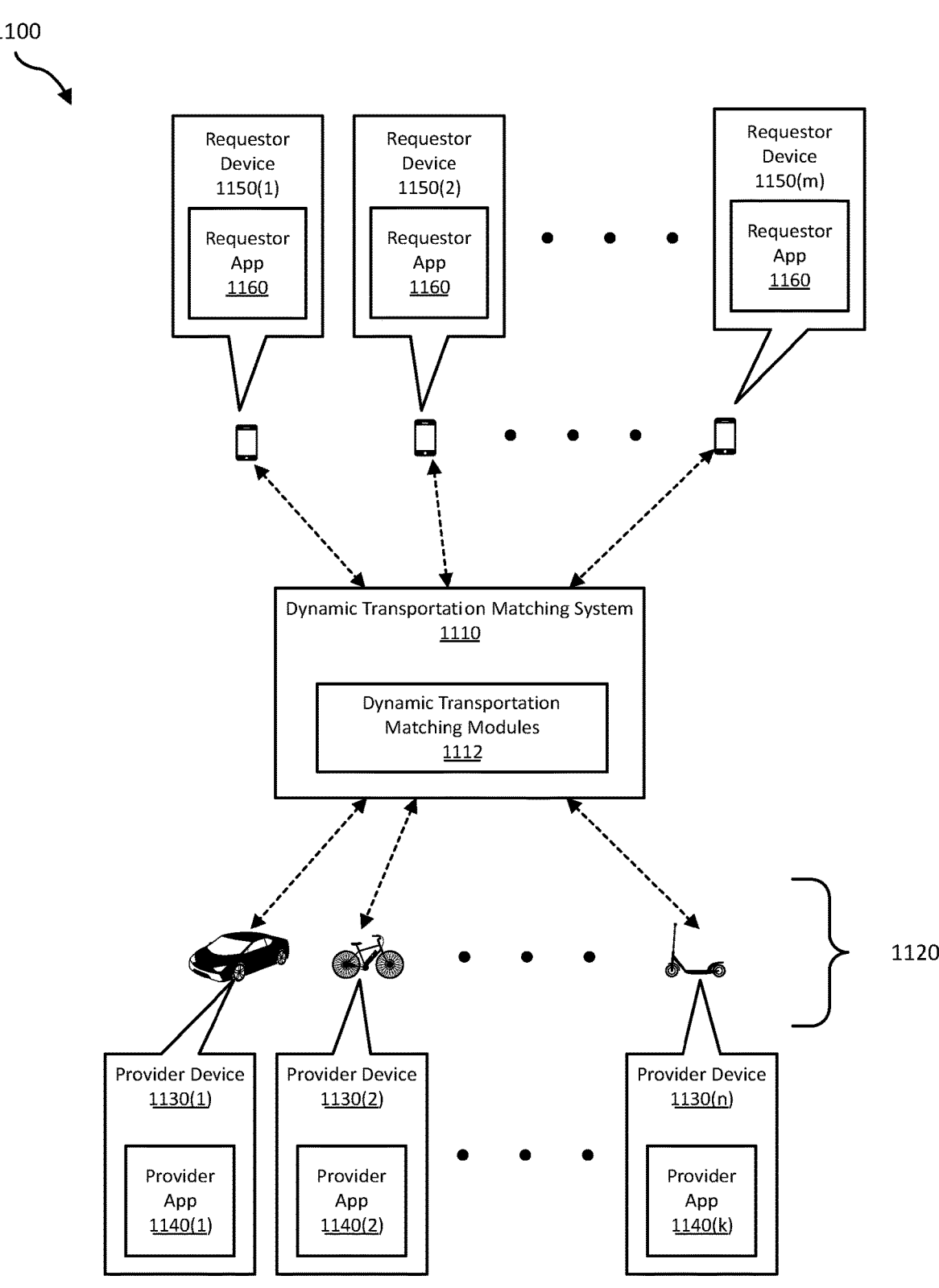
FIG. 11 is a block diagram of an example dynamic transportation management system.

FIG. 11 illustrates an example system 1100 for matching transportation requests with a dynamic transportation network that includes MMVs. As shown in FIG. 11, a dynamic transportation matching system 1110 may be configured with one or more dynamic transportation matching modules 1112 that may perform one or more of the steps described herein. Dynamic transportation matching system 1110 may represent any computing system and/or set of computing systems capable of matching transportation requests. Dynamic transportation matching system 1110 may be in communication with computing devices in each of a group of vehicles 1120. Vehicles 1120 may represent any vehicles that may fulfill transportation requests. In some examples, vehicles 1120 may include disparate vehicle types and/or models. For example, vehicles 1120 may include lane-bound vehicles and MMVs. In some examples, some of vehicles 1120 may be standard commercially available vehicles. According to some examples, some of vehicles 1120 may be owned by separate individuals (e.g., transportation providers). Furthermore, while, in some examples, many or all of vehicles 1120 may be human-operated, in some examples many of vehicles 1120 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a passenger, and/or an autonomous system for piloting a vehicle. While FIG. 11 does not specify the number of vehicles 1120, it may be readily appreciated that the systems described herein are applicable to hundreds of vehicles, thousands of vehicles, or more. In one example, dynamic transportation matching system 1110 may coordinate transportation matchings within a single region for 50,000 vehicles or more on a given day. In some examples, vehicles 1120 may collectively form a dynamic transportation network that may provide transportation supply on an on-demand basis to passengers.

As mentioned above, dynamic transportation matching system 1110 may communicate with computing devices in each of vehicles 1120. The computing devices may be any suitable type of computing device. In some examples, one or more of the computing devices may be integrated into the respective vehicles 1120. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a passenger and/or provider for a transportation matching application, a navigation application, and/or any other application suited for the use of passengers and/or providers). Additionally or alternatively, one or more of the computing devices may be devices suitable for installing in a vehicle and/or may be a vehicle's computer that has a transportation management system application installed on the computer in order to provide transportation services to passengers and/or communicate with dynamic transportation matching system 1110.

As shown in FIG. 11, vehicles 1120 may include provider devices 1130(1)-(n) (e.g., whether integrated into the vehicle, permanently affixed to the vehicle, temporarily affixed to the vehicle, worn by a driver of the vehicle, etc.). In some examples, provider devices 1130 may include provider apps 1140(1)-(k). Provider apps 1140(1)-(k) may represent any application, program, and/or module that may provide one or more services related to operating a vehicle and/or providing transportation matching services. For example, provider apps 1140(1)-(k) may include a transportation matching application for providers and/or one or more applications for matching MMVs with passenger devices. In some embodiments, different types of provider vehicles may be provisioned with different types of provider devices and/or different provider applications. For example, MMVs may be provisioned with provider devices that are configured with a provider application that enables passengers to reserve and/or operate the MMVs while road-constrained and/or lane-bound vehicles (e.g., cars) may be provisioned with provider devices that are configured with a provider application that enables provider vehicle operators (e.g., transportation providers) to respond to requests from passengers. In some examples, provider applications 1140(1)-(*k*) may match the user of provider apps 1140(1)-(*k*) (e.g., a transportation provider) with passengers through communication with dynamic transportation matching system 1110. In addition, and as is described in greater detail below, provider apps 1140(1)-(*k*) may provide dynamic transportation management system 1110 with information about a provider (including, e.g., the current location of the provider and/or vehicle) to enable dynamic transportation management system 1110 to provide dynamic transportation matching and/or management services for the provider and one or more passengers. In some examples, provider apps 1140(1)-(*k*) may coordinate communications and/or a payment between a passenger and a provider. According to some embodiments, provider apps 1140(1)-(*k*) may provide a map service, a navigation service, a traffic notification service, and/or a geolocation service.

Additionally, as shown in FIG. 11, dynamic transportation matching system 1110 may communicate with passenger devices 1150(1)-(*m*). In some examples, passenger devices 1150 may include a passenger app 1160. Passenger app 1160 may represent any application, program, and/or module that may provide one or more services related to requesting transportation matching services. For example, passenger app 1160 may include a transportation matching application for passengers. In some examples, passenger app 1160 may match the user of passenger app 1160 (e.g., a passenger) with transportation providers through communication with dynamic transportation matching system 1110. In addition, and as is described in greater detail below, passenger app 1160 may provide dynamic transportation management system 1110 with information about a passenger (including, e.g., the current location of the passenger) to enable dynamic transportation management system 1110 to provide dynamic transportation matching services for the passenger and one or more providers. In some examples, passenger app 1160 may coordinate communications and/or a payment between a passenger and a provider. According to some embodiments, passenger app 1160 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more passengers with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The transportation matching system may include and/or interface with any of a variety of subsystems that may implement, support, and/or improve a transportation matching service. For example, the transportation matching system may include a matching system (e.g., that matches passengers to ride opportunities and/or that arranges for passengers and/or providers to meet), a mapping system, a navigation system (e.g., to help a provider reach a passenger, to help a passenger reach a provider, and/or to help a provider reach a destination), a reputation system (e.g., to rate and/or gauge the trustworthiness of a passenger and/or a provider), a payment system, and/or an autonomous or semi-autonomous driving system.

The transportation matching system may be implemented on various platforms, including a passenger-owned mobile device, a computing system installed in a vehicle, a passenger-owned mobile device, a server computer system, or any other hardware platform capable of providing transportation matching services to one or more passengers and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service passengers for any service.

Figure 12:
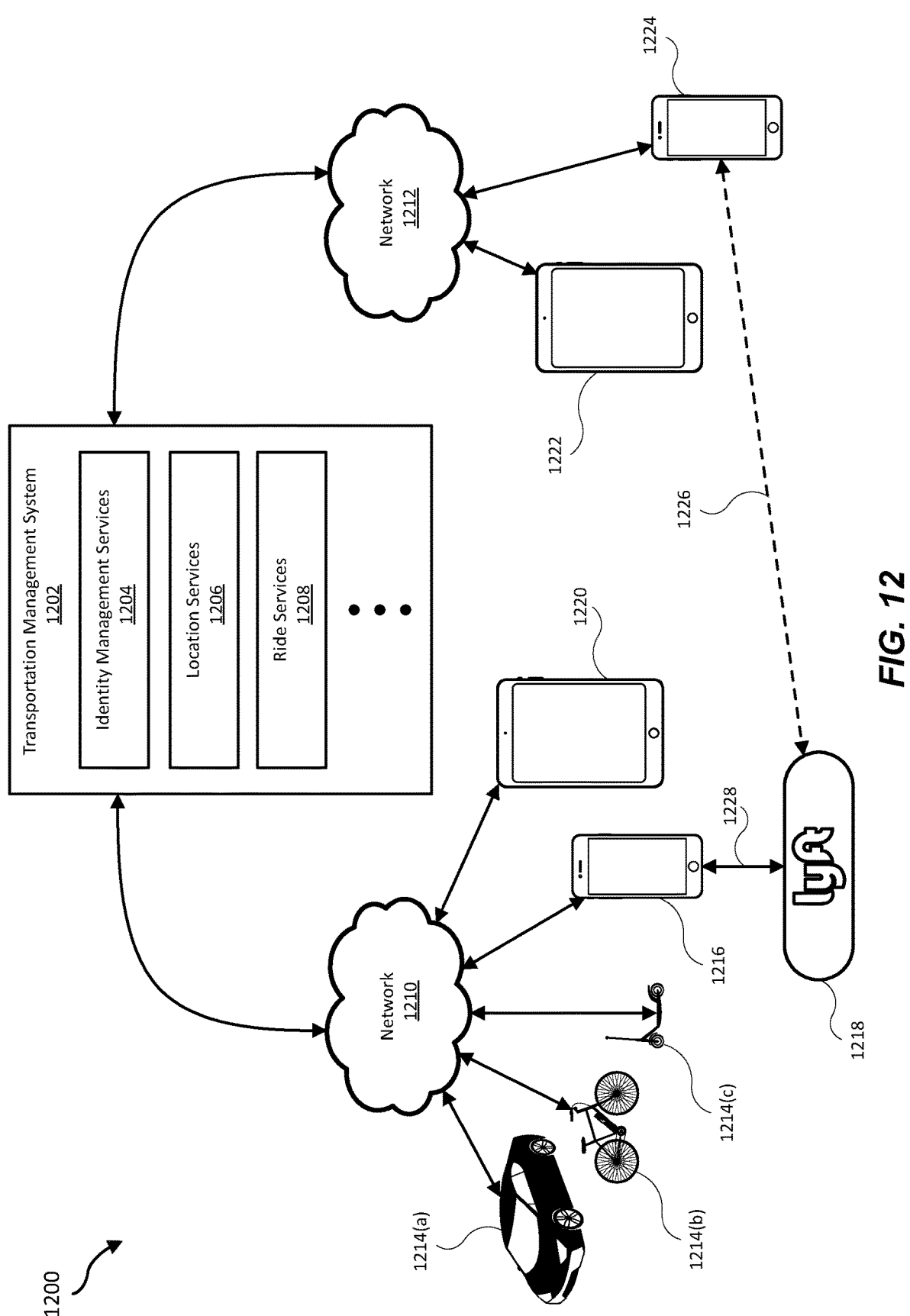
FIG. 12 is an illustration of an example passenger/provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214(*a*), 1214(*b*), and/or 1214(*c*); provider computing devices 1216 and tablets 1220; and transportation management vehicle devices 1218), and/or more or more devices associated with a ride passenger (e.g., the passenger's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for passengers and providers and/or manage their interactions and/or data with transportation management system 1202. This may include, e.g., authenticating the identity of providers and determining that they are authorized to provide services through transportation management system 1202. Similarly, passengers' identities may be authenticated to determine whether they are authorized to receive the requested services through transportation management system 1202. Identity management services 1204 may also manage and/or control access to provider and/or passenger data maintained by transportation management system 1202, such as driving and/or ride histories, vehicle data, personal data, preferences, usage patterns as a ride provider and/or as a ride passenger, profile pictures, linked third-party accounts (e.g., credentials for music and/or entertainment services, social-networking systems, calendar systems, task-management systems, etc.) and any other associated information.

Transportation management system 1202 may also manage and/or control access to provider and/or passenger data stored with and/or obtained from third-party systems. For example, a requester or provider may grant transportation management system 1202 access to a third-party email, calendar, or task management system (e.g., via the user's credentials). As another example, a passenger or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a passenger to a provider. For example, after identity management services 1204 has authenticated the identity of a ride passenger, ride services 1208 may attempt to match the passenger with one or more ride providers. In some embodiments, ride services 1208 may identify an appropriate provider using location data obtained from location services 1206. Ride services 1208 may use the location data to identify providers who are geographically close to the passenger (e.g., within a certain threshold distance or travel time) and/or who are otherwise a good match with the passenger. Ride services 1208 may implement matching algorithms that score providers based on, e.g., preferences of providers and passengers; vehicle features, amenities, condition, and/or status; providers' preferred general travel direction and/or route, range of travel, and/or availability; passengers' origination and destination locations, time constraints, and/or vehicle feature needs; and any other pertinent information for matching passengers with providers. In some embodiments, ride services 1208 may use rule-based algorithms and/or machine-learning models for matching passengers and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a passenger computing device (e.g., device 1124) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, passenger computing device 1224, passenger tablet 1222, and any other device (e.g., smart watch, smart tags, etc.). For example, transportation management vehicle device 1218 may be communicatively connected to provider computing device 1216 and/or passenger computing device 1224. Transportation management vehicle device 1218 may establish communicative connections, such as connections 1226 and 1228, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or passenger, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
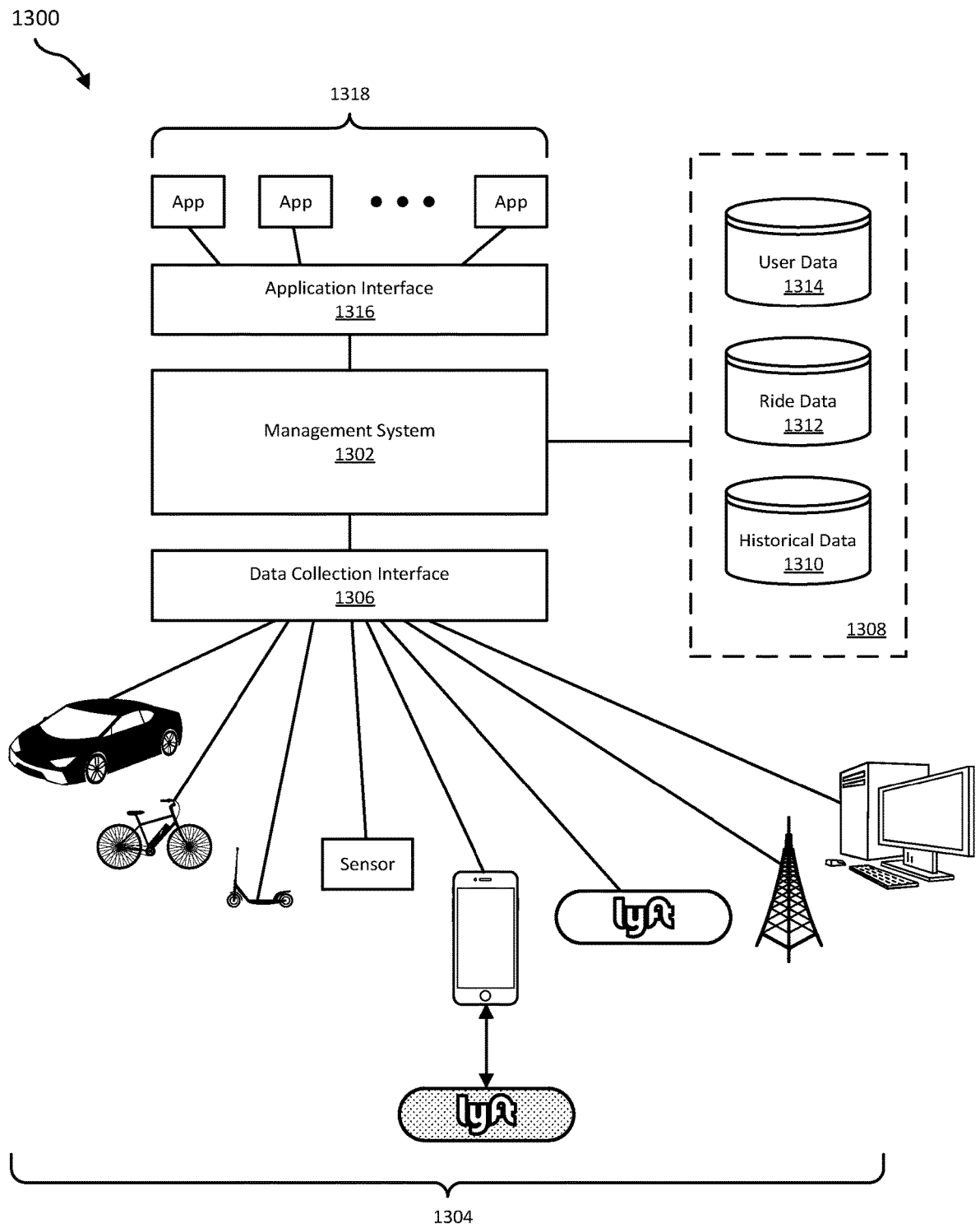
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and passenger computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data 1308. Data 1308 may include one or more data stores, such as databases, object storage systems and services, cloud-based storage services, and other data stores. For example, various data stores may be implemented on a non-transitory storage medium accessible to management system 1302, such as historical data 1310, ride data 1312, and user data 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by passenger or provider. User data 1314 may include user account data, preferences, location history, and other user-specific data, each of which may only be gathered, stored, and/or maintained in response to a user proactively agreeing or opting-in to the same. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and passenger computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

Accordingly, systems and methods are provided for predicting user preferences and providing AV features to accommodate those preferences. Other embodiments include identifying control signals for different types of autonomous vehicles and transmitting those control signals to control various features of the AVs, including those features that are preferred by the passenger.

It is well understood that the use of personally identifiable information that is capable of being transmitted, received, and/or managed using the aforementioned techniques should follow privacy policies and practices that are generally recognized as meeting or exceeding industry or governmental requirements for maintaining the privacy of users. In particular, personally identifiable information data should be managed and handled so as to minimize risks of unintentional or unauthorized access or use.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, micropro-cessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), elec-tronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specifi-cation and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specifi-cation and claims, are interchangeable with and have the same meaning as the word "comprising."

What is claimed is:

1. A system comprising:
a non-transitory memory; and
one or more hardware processors configured to execute instructions from the non-transitory memory to per-form operations comprising:
monitoring, during an autonomous vehicle (AV) ride provided by an AV carrying a passenger and man-aged by a transportation management system con-figured to manage a fleet of AVs, one or more passenger communications between the passenger and a remote agent using an in-vehicle electronic device in the AV, wherein the remote agent is located external to the AV and the in-vehicle electronic device enables communication between the remote agent and the passenger during the AV ride;
identifying, based on at least one request provided by the passenger to the remote agent using the in-vehicle electronic device, and in association with a first occurrence of a ride event during the AV ride, one or more passenger ride preferences related to the AV ride, wherein the one or more passenger ride preferences are associated with changeable features of the AV;
providing confirmation, via the in-vehicle electronic device and subsequent to the remote agent receiving the at least one request provided by the passenger in association with the first occurrence of the ride event, that the at least one request is being fulfilled, the fulfillment of which causes at least one change to the AV ride based on the one or more passenger ride preferences;
generating, based upon the at least one request pro-vided by the passenger to the remote agent, one or more predicted passenger ride preferences for the passenger, wherein during a subsequent AV ride carrying the passenger, the one or more predicted passenger ride preferences are capable of being applied to the subsequent AV ride in association with a second occurrence of the ride event;
determining that the subsequent AV ride carrying the passenger matches a previously traveled route trav-eled by the passenger;
identifying the one or more passenger ride preferences that were applied during the previously traveled route; and
applying, to the subsequent AV ride, the one or more passenger ride preferences that were applied during the previously traveled route.

2. The system of claim 1, wherein the operations further comprise:
interpreting the at least one request provided by the passenger to the remote agent using the in-vehicle electronic device during the AV ride as a request to change a route associated with the AV ride; and
applying the at least one request to cause the at least one change to the route associated with the AV ride.

3. The system of claim 1, wherein the operations further comprise:
interpreting the at least one request provided by the passenger to the remote agent using the in-vehicle electronic device during the AV ride as a request to change one or more heating, ventilation, or air conditioning (HVAC) settings in the AV; and applying the at least one request to cause the one or more changes to the HVAC settings.

4. The system of claim 1, wherein the operations further comprise:

determining, for each AV in the fleet of AVs, features of the AV that are changeable; and storing an indication of the features of the AV that are changeable.

5. The system of claim 1, wherein the operations further comprise:

during the subsequent AV ride carrying the passenger, applying the one or more predicted passenger ride preferences to the subsequent AV ride in association with the second occurrence of the ride event.

6. The system of claim 1, wherein the identifying includes inferring at least one passenger ride preference from one or more hardware sensor inputs comprise audio sensor inputs, video sensor inputs, seat sensor inputs, or seatbelt buckle sensor inputs.

7. The system of claim 1, wherein the operations further comprise:

controlling one or more features of the AV in real-time by sending specified control signals to the AV based upon the at least one request.

8. The system of claim 1, wherein applying the one or more predicted passenger ride preferences to the subsequent AV ride includes sending one or more AV control signals to the AV to control one or more features of the AV that correspond to the predicted passenger ride preferences.

9. The system of claim 1, wherein the operations further comprise altering, based at least in part on the one or more passenger ride preferences related to the AV ride that were identified, at least one aspect of a transportation network managed by the transportation management system.

10. The system of claim 9, wherein the altering of the at least one aspect of the transportation network comprises repositioning one or more additional AVs in the fleet of AVs.

11. The system of claim 1, wherein the operations further comprise:

determining that one or more current conditions exist that affect the one or more predicted passenger ride preferences, such that at least one of the one or more predicted passenger ride preferences is overridden and is not applied based on the determined current conditions; and automatically applying at least one of the one or more predicted passenger ride preferences that was not overridden based on the current conditions to the subsequent AV ride prior to the second occurrence of the ride event, such that at least one change is made to the subsequent AV ride based on the applied preferences.

12. The system of claim 1, wherein the changeable features of the AV include one or more of:

air conditioning status;

heating status;

radio station selection;

window position;

sunroof position; or seat temperature.

13. A computer-implemented method comprising:

monitoring, during an autonomous vehicle (AV) ride provided by an AV carrying a passenger and managed by a transportation management system configured to manage a fleet of AVs, one or more passenger communications between the passenger and a remote agent using an in-vehicle electronic device in the AV, wherein the remote agent is located external to the AV and the in-vehicle electronic device enables communication between the remote agent and the passenger during the AV ride;

identifying, based on at least one request provided by the passenger to the remote agent using the in-vehicle electronic device and in association with a first occurrence of a ride event during the AV ride, one or more passenger ride preferences related to the AV ride, wherein the one or more passenger ride preferences are associated with changeable features of the AV;

providing confirmation, via the in-vehicle electronic device and subsequent to the remote agent receiving the at least one request provided by the passenger in association with the first occurrence of the ride event, that the at least one request is being fulfilled, the fulfillment of which causes at least one change to the AV ride based on the one or more passenger ride preferences;

generating, based upon the at least one request provided by the passenger to the remote agent, one or more predicted passenger ride preferences for the passenger, wherein during a subsequent AV ride carrying the passenger, the one or more predicted passenger ride preferences are capable of being applied to the subsequent AV ride in association with a second occurrence of the ride event;

determining that the subsequent AV ride carrying the passenger matches a previously traveled route traveled by the passenger;

identifying the one or more passenger ride preferences that were applied during the previously traveled route; and applying, to the subsequent AV ride, the one or more passenger ride preferences that were applied during the previously traveled route.

14. The computer-implemented method of claim 13, wherein the method further comprises:

interpreting the at least one request provided by the passenger to the remote agent using the in-vehicle electronic device during the AV ride as a request to change a route associated with the AV ride; and applying the at least one request to cause the at least one change to the route associated with the AV ride.

15. The computer-implemented method of claim 13, wherein the method further comprises:

interpreting the at least one request provided by the passenger to the remote agent using the in-vehicle electronic device during the AV ride as a request to change one or more heating, ventilation, or air conditioning (HVAC) settings in the AV; and applying the at least one request to cause the one or more changes to the HVAC settings.

16. The computer-implemented method of claim 13, wherein the method further comprises:

determining, for each AV in the fleet of AVs, features of the AV that are changeable; and storing an indication of the features of the AV that are changeable.

17. The computer-implemented method of claim 16, wherein the method further comprises:

during the subsequent AV ride carrying the passenger, applying the one or more predicted passenger ride preferences to the subsequent AV ride in association with the second occurrence of the ride event.

18. The computer-implemented method of claim 13, wherein at least one of the one or more predicted passenger ride preferences are automatically applied to the subsequent AV ride prior to the second occurrence of the ride event.

19. The computer-implemented method of claim 13, further comprising:

determining that one or more current conditions exist that affect the one or more predicted passenger ride preferences, such that at least one of the one or more predicted passenger ride preferences is overridden and is not applied based on the determined current conditions; and automatically applying at least one of the one or more predicted passenger ride preferences that was not overridden based on the current conditions to the subsequent AV ride prior to the second occurrence of the ride event, such that at least one change is made to the subsequent AV ride based on the applied preferences.

20. A non-transitory computer-readable medium comprising computer-readable instructions that, when executed by at least one processor of a computing device, cause the computing device to:

monitor, during an autonomous vehicle (AV) ride provided by an AV carrying a passenger and managed by a transportation management system configured to manage a fleet of AVs, one or more passenger communications between the passenger and a remote agent using an in- vehicle electronic device in the AV, wherein the remote agent is located external to the AV and the in-vehicle electronic device enables communication between the remote agent and the passenger during the AV ride;

identify, based on at least one request provided by the passenger to the remote agent using the in-vehicle electronic device and in association with a first occurrence of a ride event during the AV ride, one or more passenger ride preferences related to the AV ride, wherein the one or more passenger ride preferences are associated with changeable features of the AV;

provide confirmation, via the in-vehicle electronic device and subsequent to the remote agent receiving the at least one request provided by the passenger in association with the first occurrence of the ride event, that the at least one request is being fulfilled, the fulfillment of which causes at least one change to the AV ride based on the one or more passenger ride preferences;

generate, based upon the at least one request provided by the passenger to the remote agent, one or more predicted passenger ride preferences for the passenger, wherein during a subsequent AV ride carrying the passenger, the one or more predicted passenger ride preferences are capable of being applied to the subsequent AV ride in association with a second occurrence of the ride event;

determine that the subsequent AV ride carrying the passenger matches a previously traveled route traveled by the passenger;

identify the one or more passenger ride preferences that were applied during the previously traveled route; and apply, to the subsequent AV ride, the one or more passenger ride preferences that were applied during the previously traveled route.

21. The computer-readable medium of claim 20, wherein the computing device is further configured to apply, during the subsequent AV ride carrying the passenger, the one or more predicted passenger ride preferences to the subsequent AV ride in association with the second occurrence of the ride event.

*  *  *  *  *